US012635678B2

(12) United States Patent
Auderer et al.

(10) Patent No.: US 12,635,678 B2
(45) Date of Patent: May 26, 2026

(54) SPRAYER CONTROL BASED ON PREDICTIVE CROP CHARACTERISTICS

(71) Applicant: Deere & Company, Moline, IL (US)

(72) Inventors: Travis J. Auderer, Ankeny, IA (US);
Nathan R. Vandike, Geneseo, IL (US);
Kevin A. Thelen, Ankeny, IA (US);
Richard A. Humpal, Ankeny, IA (US);
Bhanu Kiran Reddy Palla, Bettendorf, IA (US)

(73) Assignee: Deere & Company, Moline, IL (US)

( * ) Notice: Subject to any disclaimer, the term of this patent is extended or adjusted under 35 U.S.C. 154(b) by 661 days.

(21) Appl. No.: 18/194,194

(22) Filed: Mar. 31, 2023

(65) Prior Publication Data

US 2023/0309542 A1 Oct. 5, 2023

Related U.S. Application Data

(60) Provisional application No. 63/327,246, filed on Apr. 4, 2022, provisional application No. 63/327,248, filed (Continued)

(51) Int. Cl.
*A01M 7/00* (2006.01)
*A01B 69/04* (2006.01)

(Continued)

(52) U.S. Cl.
CPC ......... *A01M 7/0089* (2013.01); *A01B 69/008* (2013.01); *A01M 7/0057* (2013.01);

(Continued)

(58) Field of Classification Search
CPC . A01M 7/0089; A01M 7/0057; A01B 69/008; G05D 2105/15; G06Q 50/02; G16Y 10/05
See application file for complete search history.

(56) References Cited

U.S. PATENT DOCUMENTS 5,995,895 A 11/1999 Watt et al.
9,008,918 B2 4/2015 Missotten et al.

(Continued)

OTHER PUBLICATIONS

Arthur F. Lange; John Peake, "Precision Agriculture," in Position, Navigation, and Timing Technologies in the 21st Century: Integrated Satellite Navigation, Sensor Systems, and Civil Applications , IEEE, 2021, pp. 1735-1747. (Year: 2021).*

(Continued)

*Primary Examiner* — Joan T Goodbody
(74) *Attorney, Agent, or Firm* — Kelly, Holt & Christenson; Joseph R. Kelly

(57) ABSTRACT

An information map is obtained by an agricultural system. The information map maps characteristic values at different geographic locations in a worksite. An in-situ sensor detects values of a crop characteristic as a mobile machine operates at the worksite. A predictive map generator generates a predictive map that maps predictive values of the crop characteristic at different geographic locations in the worksite based on a relationship between the values of the characteristic in the information map and the values of the crop characteristic detected by the in-situ sensor. The predictive map can be output and used in automated machine control.

18 Claims, 13 Drawing Sheets

Related U.S. Application Data on Apr. 4, 2022, provisional application No. 63/327,247, filed on Apr. 4, 2022.

(51) Int. Cl.

| | |
|---|---|
| G05D 105/15 | (2024.01) |
| G06Q 50/02 | (2012.01) |
| G16Y 10/05 | (2020.01) |

(52) U.S. Cl.
CPC ......... *G05D 2105/15* (2024.01); *G06Q 50/02* (2013.01); *G16Y 10/05* (2020.01)

(56) References Cited

U.S. PATENT DOCUMENTS

| | | | |
|---|---|---|---|
| 10,441,965 | B2 | 10/2019 | Feldhaus et al. |
| 11,079,725 | B2 | 8/2021 | Palla et al. |
| 11,178,818 | B2 | 11/2021 | Brammeier et al. |
| 11,234,366 | B2 | 2/2022 | Darr et al. |
| 11,240,961 | B2 | 2/2022 | Anderson et al. |
| 11,467,605 | B2 | 10/2022 | Palla et al. |
| 11,474,523 | B2 | 10/2022 | Vandike et al. |
| 11,477,940 | B2 | 10/2022 | Palla et al. |
| 11,589,509 | B2 | 2/2023 | Vandike et al. |
| 11,592,822 | B2 | 2/2023 | Vandike et al. |
| 11,635,765 | B2 | 4/2023 | Vandike et al. |
| 11,641,800 | B2 | 5/2023 | Blank et al. |
| 11,650,553 | B2 | 5/2023 | Palla et al. |
| 11,650,587 | B2 | 5/2023 | Vandike et al. |
| 11,653,588 | B2 | 5/2023 | Vandike et al. |
| 11,672,203 | B2 | 6/2023 | Vandike et al. |
| 11,675,354 | B2 | 6/2023 | Vandike et al. |
| 11,711,995 | B2 | 8/2023 | Vandike et al. |
| 11,727,680 | B2 | 8/2023 | Vandike et al. |
| 2020/0323133 | A1 | 10/2020 | Anderson et al. |
| 2021/0029878 | A1* | 2/2021 | Vandike ............... A01D 41/127 |
| 2021/0243936 | A1 | 8/2021 | Vandike et al. |
| 2021/0243938 | A1 | 8/2021 | Blank et al. |
| 2021/0243951 | A1 | 8/2021 | Vandike et al. |
| 2021/0321566 | A1 | 10/2021 | Darr et al. |
| 2022/0110236 | A1 | 4/2022 | Vandike et al. |
| 2022/0110237 | A1* | 4/2022 | Vandike ............... G05D 1/0278 |
| 2022/0110238 | A1 | 4/2022 | Vandike et al. |
| 2022/0110246 | A1 | 4/2022 | Vandike et al. |
| 2022/0110247 | A1 | 4/2022 | Vandike et al. |
| 2022/0110248 | A1 | 4/2022 | Vandike et al. |
| 2022/0110249 | A1 | 4/2022 | Vandike et al. |
| 2022/0110250 | A1 | 4/2022 | Vandike et al. |
| 2022/0110251 | A1 | 4/2022 | Vandike et al. |
| 2022/0110252 | A1 | 4/2022 | Vandike et al. |
| 2022/0110253 | A1 | 4/2022 | Anderson et al. |
| 2022/0110254 | A1 | 4/2022 | Vandike et al. |
| 2022/0110255 | A1 | 4/2022 | Vandike et al. |
| 2022/0110256 | A1 | 4/2022 | Vandike et al. |
| 2022/0110257 | A1 | 4/2022 | Vandike et al. |
| 2022/0110258 | A1 | 4/2022 | Vandike et al. |
| 2022/0110259 | A1 | 4/2022 | Vandike et al. |
| 2022/0110262 | A1 | 4/2022 | Vandike et al. |
| 2022/0113141 | A1 | 4/2022 | Vandike et al. |
| 2022/0113142 | A1* | 4/2022 | Vandike ............. G01C 21/3826 |
| 2022/0113161 | A1 | 4/2022 | Vandike et al. |
| 2022/0113727 | A1 | 4/2022 | Vandike et al. |
| 2022/0113729 | A1 | 4/2022 | Vandike et al. |
| 2022/0113733 | A1 | 4/2022 | Vandike et al. |
| 2022/0167547 | A1 | 6/2022 | Vandike et al. |
| 2022/0232763 | A1 | 7/2022 | Palla et al. |
| 2022/0232816 | A1 | 7/2022 | Vandike et al. |
| 2023/0148474 | A1 | 5/2023 | Vandike et al. |
| 2023/0161347 | A1 | 5/2023 | Vandike et al. |
| 2023/0189710 | A1 | 6/2023 | Anderson et al. |
| 2023/0213900 | A1 | 7/2023 | Palla et al. |
| 2023/0217850 | A1 | 7/2023 | Vandike et al. |
| 2023/0217857 | A1 | 7/2023 | Vandike et al. |
| 2023/0217858 | A1 | 7/2023 | Vandike et al. |
| 2023/0225238 | A1 | 7/2023 | Blank et al. |

OTHER PUBLICATIONS

T. K. Hamrita, E. W. Tollner and R. L. Schafer, "Towards a robotic farming vision: advances in sensors and controllers for agricultural system applications, " IAS '96. Conf. Record of the 1996 IEEE Industry Appl. Con. Thirty-First IAS Annual Meeting, San Diego, CA, USA, 1996, pp. 1678-1686 vol. 3. (Year: 1996).*

* cited by examiner

SPRAYER CONTROL BASED ON PREDICTIVE CROP CHARACTERISTICS

CROSS-REFERENCE TO RELATED APPLICATIONS

The present application is based on and claims the benefit of U.S. provisional patent applications Ser. No. 63/327,248, filed Apr. 4, 2022, Ser. No. 63/327,247, filed Apr. 4, 2022, and Ser. No. 63/327,246, filed Apr. 4, 2022, the content of which are hereby incorporated by reference in their entirety.

FIELD OF THE DESCRIPTION

The present description relates to mobile machines, particularly mobile machines configured to apply product to a field such as mobile agricultural sprayers.

BACKGROUND

There are a wide variety of different mobile machines. Some mobile machines apply product, such as fertilizer, pesticide, herbicide, as well as a variety of other products to a field. One such machine is an agricultural sprayer. An agricultural sprayer often includes one or more tanks or reservoirs that hold a fluid product (substance) to be sprayed on an agricultural field. Such systems typically include a fluid line or conduit mounted on a foldable, hinged, or retractable and extendible boom. The fluid line is coupled to one or more spray nozzles mounted along the boom. The spray nozzles are configured to receive the fluid and direct atomized fluid, in a dispersal area, to a crop or field during application. As the sprayer travels through the field, the boom is moved to a deployed position and the product is pumped from the one or more tanks or reservoirs, through the nozzles, so that it is sprayed or applied to the crop or field over which the sprayer is traveling.

The discussion above is merely provided for general background information and is not intended to be used as an aid in determining the scope of the claimed subject matter.

SUMMARY

An information map is obtained by an agricultural system. The information map maps characteristic values at different geographic locations in a worksite. An in-situ sensor detects values of a crop characteristic as a mobile machine operates at the worksite. A predictive map generator generates a predictive map that maps predictive values of the crop characteristic at different geographic locations in the worksite based on a relationship between the values of the characteristic in the information map and the values of the crop characteristic detected by the in-situ sensor. The predictive map can be output and used in automated machine control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3A illustrates one example of a multi-spray nozzle assembly including a plurality of spray nozzles.

FIG. 3B illustrates examples of the spray patterns and dispersal areas of the plurality of spray nozzles shown in FIG. 3A.

FIGS. 7A-7B (collectively referred to herein as FIG. 7) show a flow diagram illustrating one example of operation of an agricultural spraying system in generating a map.

DETAILED DESCRIPTION

Figure 1:
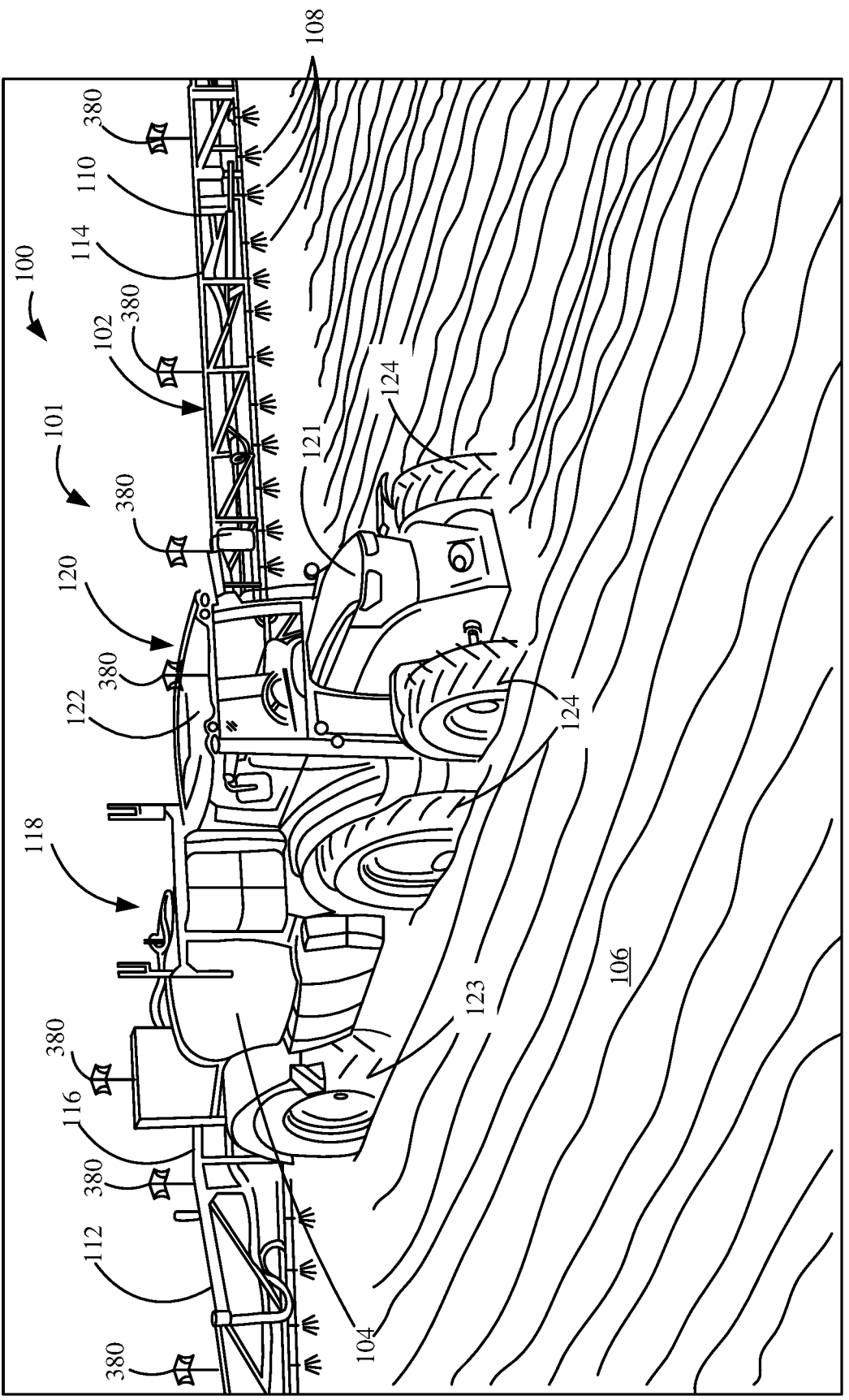
FIG. 1 illustrates one example of a mobile machine as an agricultural sprayer.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In some examples, the present description relates to using in-situ data taken concurrently with an operation, such as an agricultural spraying operation, in combination with prior or predicted data, such as prior or predicted data represented in a map, to generate a predictive model and a predictive map, such as a predictive crop characteristic model and a predictive crop characteristic map. In some examples, the predictive crop characteristic map can be used to control a mobile machine, such as an agricultural sprayer.

As discussed above, agricultural sprayers apply products, such as fertilizer (or other nutrients), pesticide, insecticide, herbicide, as well as various other products to a field. Maintaining a distance between the boom (and components thereof) of the sprayer and the crop on the field is often desirable. For instance, the distance between the crop plants and the boom (or nozzles on the boom) can affect the product application. As the dispersal area of spray nozzles typically widens the further the distance from the spray nozzle, the distance between the nozzle and the crop plants will affect how the product is applied to the crop. Additionally, contact between the boom (or components thereof) can damage the crop plant. Thus, the machine height or the boom height can be controlled to maintain a distance between the boom and the crop plants. In some instances, and for various reasons, it may not be possible to alter the machine height or boom height, and thus, contact between the boom and the crop plants, in some areas of the field, may be unavoidable. To limit damage due to contact between the boom and the crop plants, the travel speed of the sprayer can be adjusted (e.g., decreased). Additionally, one example of a mobile agricultural sprayer includes a multi-spray nozzle assembly, with a plurality of nozzles, each nozzle having a different spray pattern. Due to the distance between the spray nozzles and the crop plants, it may be desirable to deactivate one nozzle and activate a different nozzle to adjust the spray pattern and corresponding dispersal of the product. Where there is little or no risk of contact between the machine and the crop plants it may be possible to increase machine speed, thereby increasing the efficiency (time to complete) of the operation.

The density of crop at the worksite (field) can also vary and affect the performance of the agricultural sprayer. For instance, where the crops are more dense the product may need to be applied more widely to adequately cover the dense crop, thus the boom height or machine height may be adjusted to alter the dispersal area. Similarly, in some examples, it may be desirable to switch from one nozzle to another nozzle (e.g., deactivate one nozzle and activate another nozzle) to alter the dispersal area. In another example, where the crops are less dense, it may be desirable to apply the products less widely. In this way, less product is wasted and can also have other benefits such as reducing contamination of surrounding soil and possibly reducing airborne drift. Thus, the boom height or machine may be adjusted to alter the dispersal area. Similarly, in some examples, it may be desirable to switch from one nozzle to another nozzle (e.g., deactivate one nozzle and activate another nozzle) to alter the dispersal area.

In one example, the present description relates to obtaining an information map such as a vegetative index map. A vegetative index map illustratively maps georeferenced vegetative index values (which may be indicative of vegetative growth or plant health) across different geographic locations in a field of interest. One example of a vegetative index includes a normalized difference vegetation index (NDVI). There are many other vegetative indices that are within the scope of the present disclosure. In some examples, a vegetative index map be derived from sensor readings of one or more bands of electromagnetic radiation reflected by the plants. Without limitations, these bands may be in the microwave, infrared, visible or ultraviolet portions of the electromagnetic spectrum. A vegetative index map can be used to identify the presence and location of vegetation. In some examples, these maps enable vegetation to be identified and georeferenced in the presence of bare soil, crop residue, or other plants, including crop or other weeds. The sensor readings can be taken at various times during the growing season (or otherwise prior to spraying), such as during satellite observation of the field of interest, a fly over operation (e.g., manned or unmanned aerial vehicles), sensor readings during a prior operation (e.g., prior to spraying or prior to a particular spraying operation) at the field of interest, as well as during a human scouting operation. These are merely some examples. The vegetative index map can be generated in a variety of ways.

In one example, the present description relates to obtaining an information map such as a seeding map. The seeding map illustratively maps georeferenced seeding characteristic values, such as location values of planted seeds, seed and row spacing values, population values, as well as seed (and thus crop genotype across different geographic locations in a field of interest. Crop genotype values can indicate the variety (e.g., species, hybrid, cultivar, etc.) of the crop plants at the field. The seeding map may be derived from sensor readings during a prior seeding operation at the field of interest by a seeding machine. For instance, the genotype data for the seeds being planted may be known (e.g., provided by the seed producer) and the seeding machine may provide sensor data indicative of locations at which the seeds are planted. These are merely some examples. In other examples, the seeding map or georeferenced crop genotype values may be derived in other ways.

The present discussion proceeds, in some examples, with respect to systems that obtain one or more maps of a worksite, such as one or more of a vegetative index map, a seeding map, and another type of map, and also use an in-situ sensor to detect a crop characteristic, such as crop height or crop density. The systems generate a model that models a relationship between the values on the one or more obtained maps and the output values from the in-situ sensor. The model is used to generate a predictive map that predicts, for example, crop characteristic values (e.g., crop height values or crop density values) to different geographic locations in the worksite. The predictive map, generated during an operation, can be presented to an operator or other user or used in automatically controlling a mobile machine, such as an agricultural sprayer, during an operation, or both.

While the various examples described herein proceed with respect to mobile agricultural machines, such as agricultural sprayers, and with respect to agricultural operations, such as agricultural spraying operations, it will be appreciated that the systems and methods described herein are applicable to various other mobile machines and various other machine operations, for example forestry machines and forestry operations, constructions machines and construction operations, and turf management machines and turf management operations. Additionally, while examples herein proceed with respect to certain example product application machines, such as certain example spraying machines, it will be appreciated that the systems and methods described herein are applicable to various other types of product application machines, including various other types of agricultural spraying machines.

FIG. 1 illustrates an agricultural spraying machine (or agricultural sprayer) 101 as one example of a mobile machine 100. Sprayer 101 includes a spraying system 102 having a tank 104 containing a product, such as a liquid product, that is to be applied to field 106. Tank 104 is fluidically coupled to spray nozzles 108 by a delivery system comprising a set of conduits. A fluid pump is configured to pump the product from tank 104 through the conduits and through nozzles 108 to apply the product to the field 106. In some examples, the fluid pump is actuated by operation of a motor, such as an electric motor or hydraulic motor, that drives the pump.

Spray nozzles 108 are coupled to, and spaced apart along, boom 110. Boom 110 includes arms 112 and 114 which are coupled to a center frame 116. In some examples, arms 112 and 114 can articulate and pivot relative to center frame 116. In some examples, center frame can be actuated up and down to adjust its height above field 106. In some examples, arms 112 and 114 can articulate and pivot relative to center frame 116 and center frame 116 can be actuated up and down. Thus, in some examples, arms 112 and 114 are movable between a storage or transport position and an extended or deployed position (shown in FIG. 1). The boom 110, including each arm 112 and 114, can include multiple discrete and controllable sections which are supplied product from tank 104 by the fluid pump through a respective conduit of each section.

Each section can include a respective set of one or more spray nozzles 108. Each section can be activated or deactivated through the actuation of a corresponding controllable valve, for instance, a section can be deactivated, that is the section or the nozzles of the section, or both, are prevented from receiving fluid, by actuation of a controllable valve that is upstream of the section or the nozzles, or both. In some examples, the nozzles of the section may each have an associated controllable valve which can be actuated to activate or deactivate the nozzles. The application rate of product is the rate (volumetric rate) at which product is applied to the field over which sprayer 100 travels. The application rate corresponds to a volumetric flow rate of the product from the tank 104 through the spray nozzles 108. The volumetric flow rate is controlled by operation of the pump, such as by varying the speed of actuation of the pump with an associated motor. In some examples, where the application rate is controlled for individual sections or for individual nozzles, a controllable valve, such as solenoid valve, a piezo valve, or the like, that corresponds to each section or to each nozzle, can be operable to reciprocate (e.g., pulse) between a closed state and an open state at variable frequency (e.g., pulse width modulation control) to control the rate at which the product is discharged from the set of spray nozzles 108 of the respective section or from the respective individual spray nozzle 108.

In the example illustrated in FIG. 1, agricultural sprayer 101 comprises a towed implement 118 that carries the spraying assembly, and a towing or support machine 120 (illustratively a tractor) that tows the towed spraying implement 118. Towed implement 118 includes a set of ground engaging elements, such as wheels 123. Towing machine 120 includes a power plant 121, such as internal combustion engine that drives rotation of a set of ground engaging elements, such as wheels 124, to propel the sprayer 101 over field 106 at variable speeds. The ground engaging elements can also be tracks, or other traction elements as well. In the example illustrated, towing machine 120 includes an operator compartment or cab 122, which can include a variety of different operator interface mechanisms (e.g., 318 shown in FIG. 4) for controlling agricultural sprayer 101.

Agricultural sprayer 101 can include a variety of sensors (some of which will be described in more detail in FIG. 4). In the illustrated example, agricultural sprayer 101 includes one or more crop characteristic sensors 380, which can be disposed at a plurality of different locations on sprayer 101 (e.g., boom 110, including on each of arm 112 and 114, towed implement 118, and towing machine 120). Crop characteristic sensors 380 detect characteristics of crops at field 106, such as crop height and crop density. As used herein, crop density refers to the space, in a given area of interest, occupied by actual crop matter. In some instances, the area of interest is defined by the field of view of the crop characteristic sensor 380. Crop characteristic sensors 380 can include one or more different types of sensors, such an imaging system, for instance a camera (e.g., a stereo camera or mono camera), optical sensors, lidar, radar, sonar, ultrasound, as well as various other sensors. Crop characteristic sensors 380 generate sensor data (such as signals and/or images) that indicate or can be used to derive crop characteristic values, such as crop height values and crop density values.

Additionally, agricultural sprayer 101 can include a plurality of machine height actuators, such as hydraulic actua-tors, or pneumatic actuators (such as inflatable and deflatable air bags), electromechanical actuators, etc., which can adjust the height of a main frame of implement 118 above field 106, such as by adjusting a distance between the main frame and the corresponding axles of ground engaging elements 123. Thus, machine height actuators, in one example, act as an adjustable suspension that can raise and lower the height of the sprayer 101 above the surface over which it travels. These are merely some examples.

Further, agricultural sprayer 101 can include a plurality of boom height actuators such as hydraulic actuators, pneumatic actuators, electromechanical actuators, etc., which raise and lower the height of boom 110 above the surface over which sprayer 101 travels. In some examples, the boom height actuators drive movement of center frame 116. In some examples, the boom height actuators drive rotation of arms 112 and 114. In some examples, each arm 112 and 114 can have multiple sections, each section having a corresponding boom height actuator that drives movement (e.g., rotation) of its corresponding section. These are merely some examples.

Figure 2:
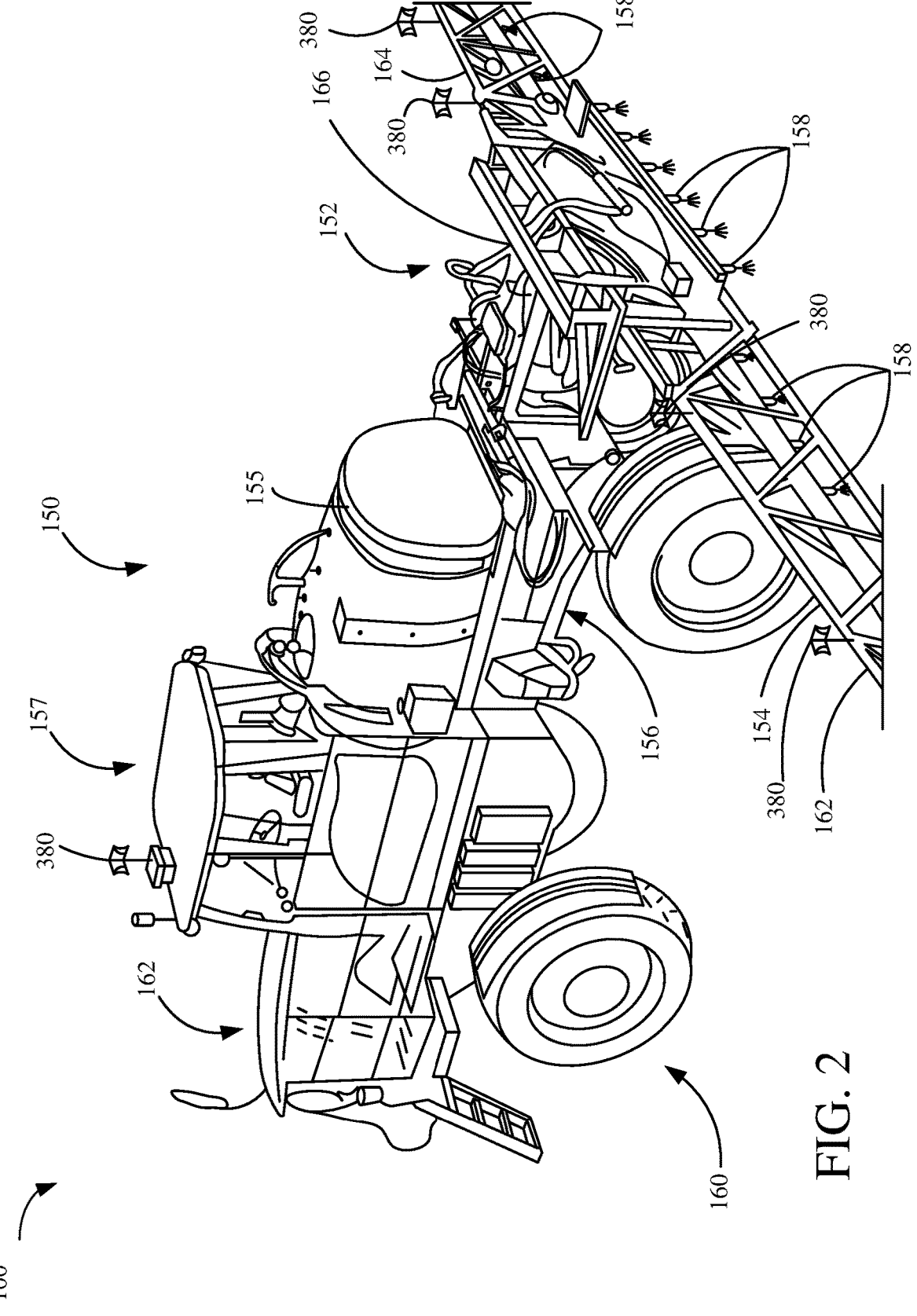
FIG. 2 illustrates one example of a mobile machine as an agricultural sprayer.

FIG. 2 illustrates one example of an agricultural sprayer 150 that is self-propelled as an example mobile machine 100. Sprayer 150 has an on-board spraying system 152, including, among other things, a tank 155 containing a product and a boom 154, that is carried on a machine frame 156 having an operator compartment 157, a set of ground engaging elements 160, such as wheels or tracks, and a power plant 162, such as an internal combustion engine, that drives rotation of ground engaging elements 160 to propel sprayer 150 over the worksite (field) at which it operates. Operator compartment 157 can include a variety of different operator interface mechanisms (e.g., 318 shown in FIG. 4) for controlling agricultural sprayer 150. Tank 155 is fluidically coupled to spray nozzles 158 by a delivery system comprising a set of conduits. A fluid pump is configured to pump the product from tank 155 through the conduits and through nozzles to apply the product to the field over which agricultural sprayer 150 travels. In some examples, the fluid pump is actuated by operation of a motor, such as an electric motor or hydraulic motor, that drives the pump.

Spray nozzles 158 are coupled to, and spaced apart along, boom 154. Boom 154 includes arms 162 and 164 which are coupled to a center frame 166. In some examples, arms 162 can articulate or pivot relative to center frame 166, such as by actuation of one or more actuators. Thus, arms 162 and 164 are movable between a storage or transport position and an extended or deployed position (shown in FIG. 2). In some examples, center frame 166 can be actuated up and down (by one or more actuators) to change a height of center frame 166 above the worksite. The boom 154, including each arm 162 and 164, can include multiple discrete and controllable sections which are supplied product from tank 155 by the fluid pump through a respective conduit of each section.

Each section can include a respective set of one or more spray nozzles 158. Each section can be activated or deactivated through the actuation of a corresponding controllable valve, for instance, a section can be deactivated, that is the section or the nozzles of the section, or both, are prevented from receiving fluid, by actuation of a controllable valve that is upstream of the section or the nozzles, or both. In some examples, the nozzles of the section may each have an associated controllable valve which can be actuated to activate or deactivate the nozzles. The application rate of product is the rate (volumetric rate) at which product is applied to the field over which sprayer 150 travels. The application rate corresponds to a volumetric flow rate of the product from the tank 155 through the spray nozzles 158. The volumetric flow rate is controlled by operation of the pump, such as by varying the speed of actuation of the pump with an associated motor. In some examples, where the application rate is controlled for individual sections or for individual nozzles, a controllable valve, such as solenoid valve, a piezo valve, or the like, that corresponds to each section or to each nozzle, can be operable to reciprocate (e.g., pulse) between a closed state and an open state at variable frequency (e.g., pulse width modulation control) to control the rate at which the product is discharged from the set of spray nozzles 158 of the respective section or from the respective individual spray nozzle 158.

Agricultural sprayer 150 can include a variety of sensors (some of which will be described in more detail in FIG. 4). In the illustrated example, agricultural sprayer 150 includes one or more crop characteristic sensors 380, which can be disposed at a plurality of different locations on sprayer 150 (e.g., boom 154, including on each of arm 162 and 164, as well as at various other locations such as the roof of operator compartment 157).

Additionally, agricultural sprayer 150 can include a plurality of machine height actuators, such as hydraulic actuators, or pneumatic actuators (such as inflatable and deflatable air bags), electromechanical actuators, etc., which can adjust the height of a main frame 156 of sprayer above the field, such as by adjusting a distance between the main frame 156 and the corresponding axles of ground engaging elements 160. Thus, machine height actuators, in one example, act as an adjustable suspension that can raise and lower the height of the sprayer 150 above the surface over which it travels. These are merely some examples.

Further, agricultural sprayer 150 can include a plurality of boom height actuators such as hydraulic actuators, pneumatic actuators, electromechanical actuators, etc., which raise and lower the height of boom 154 above the surface over which sprayer 150 travels. In some examples, the boom height actuators drive movement of center frame 166 to alter a height of the boom 154 above the worksite. In some examples, the boom height actuators drive rotation of arms 162 and 164 to alter a height of the arms 162 and 164 above the worksite. In some examples, each arm 162 and 164 can have multiple sections, each section having a corresponding boom height actuator that drives movement (e.g., rotation) of its corresponding section to alter a height of the sections above the worksite. These are merely some examples.

Figures 3A, 3B:
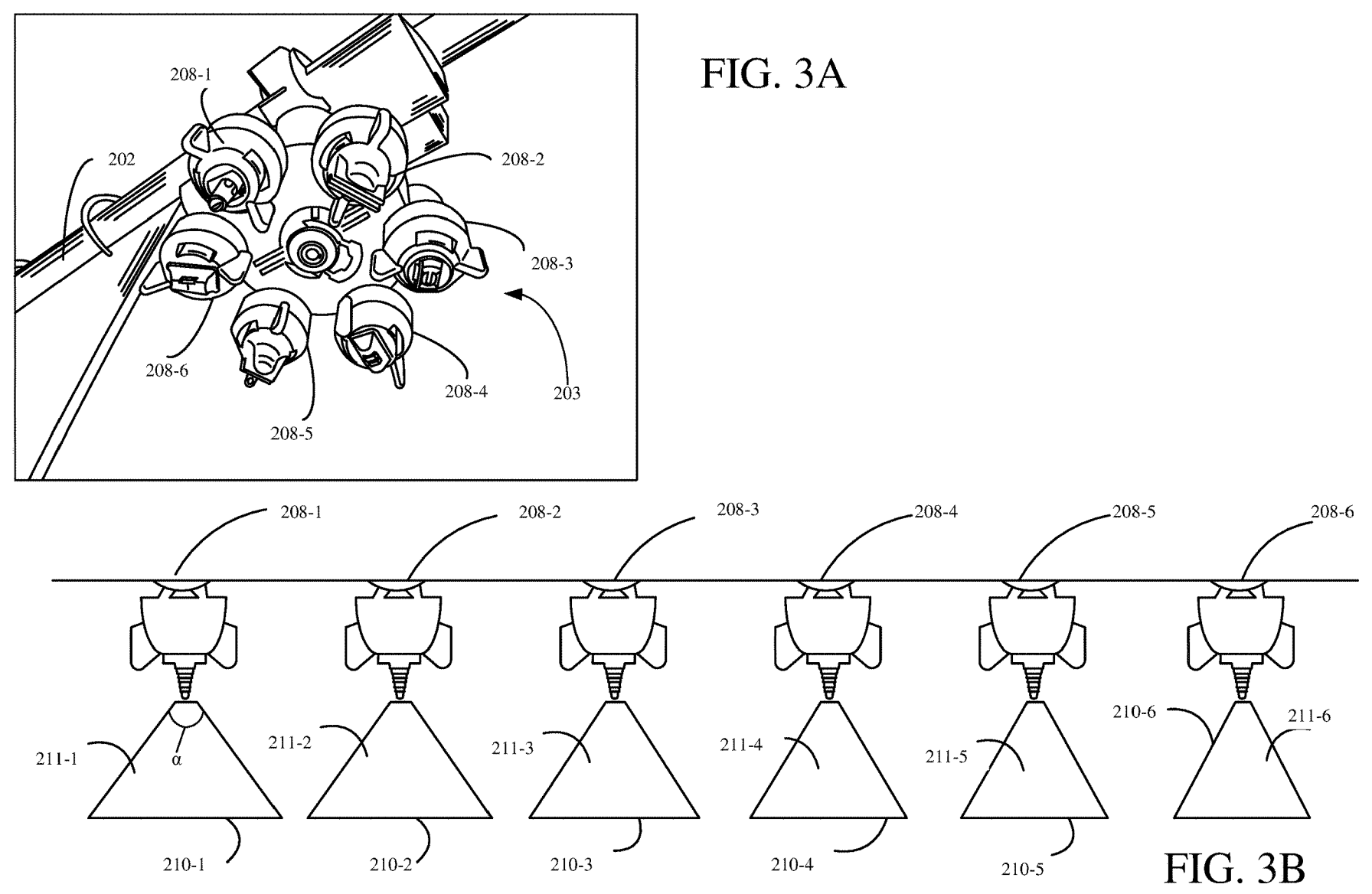

FIG. 3A illustrates a multi-spray nozzle assembly 203 that includes a plurality of individual spray nozzles 208, illustratively shown as 208-1 to 208-6, and can be mounted to a boom 202 of an agricultural sprayer. Boom 202 can be similar to boom 110 or boom 154. Instead of the nozzles 108 and 158 illustrated in FIGS. 1-2, an agricultural sprayer, such as sprayer 101 or 150, or both, can include a plurality of multi-spray nozzle assemblies 203 spaced apart along their respective boom (110 and 154, respectively). The individual nozzles 208-1 through 208-6 of multi-spray nozzle assembly 203 can be individually activated and deactivated, such as by actuation of one or more valves (e.g., each individual nozzle can include a corresponding valve). Additionally, and as will be shown in more detail in FIG. 3B, each individual nozzle 208 can have different spray characteristics, such as a different fixed spray pattern 210 and corresponding dispersal area 211. Thus, each individual nozzle 208 can disperse product differently.

In some examples, depending on the height of the crop or the density of the crop, or both, and the distance of the spray nozzle from the crop, a different spray pattern may be desirable. As can be seen in FIG. 3B, the dispersal areas 211-1 through 211-6 widen as the distance from the respective spray nozzles 208-1 through 208-6 increases. That is, the theoretical coverage of the spray nozzle 208 generally increases as the distance between the spray nozzle and the target object/surface increases. In the illustrated example of FIG. 3B, each separate nozzle 208 has a different spray angle α and thus a different spray pattern 210 and corresponding dispersal area 211. In some examples, the spray angle α of each nozzle 208 can be different, can all be the same, or there can multiple nozzles 208 with a first spray angle α, multiple spray nozzles 208 with a second spray angle α, and multiple spray nozzles 208 with a third spray angle α. For instance, the nozzles can operate simultaneously in pairs having the same spray angle α, and the different pairs can be activated and deactivated. In the illustrated example, the spray angles α decrease moving from left to right in FIG. 3B. In one example, the spray angles fall within a range of 60° to 80°, with each nozzle having a different spray angle α, and thus a different fixed spray pattern 210 and corresponding dispersal area 211. Thus, and as will be described in FIG. 4, the nozzles 208 of multi-spray nozzle assembly 203 can be controllably activated and deactivated to vary a spray pattern and corresponding dispersal of the product applied to the field.

While a particular number and arrangement of nozzles 208 are shown, in other examples the number and arrangement can differ. For instance, more or less nozzles 208 may be utilized. Additionally, the nozzles can be spaced apart in a variety of different ways.

Figure 4:
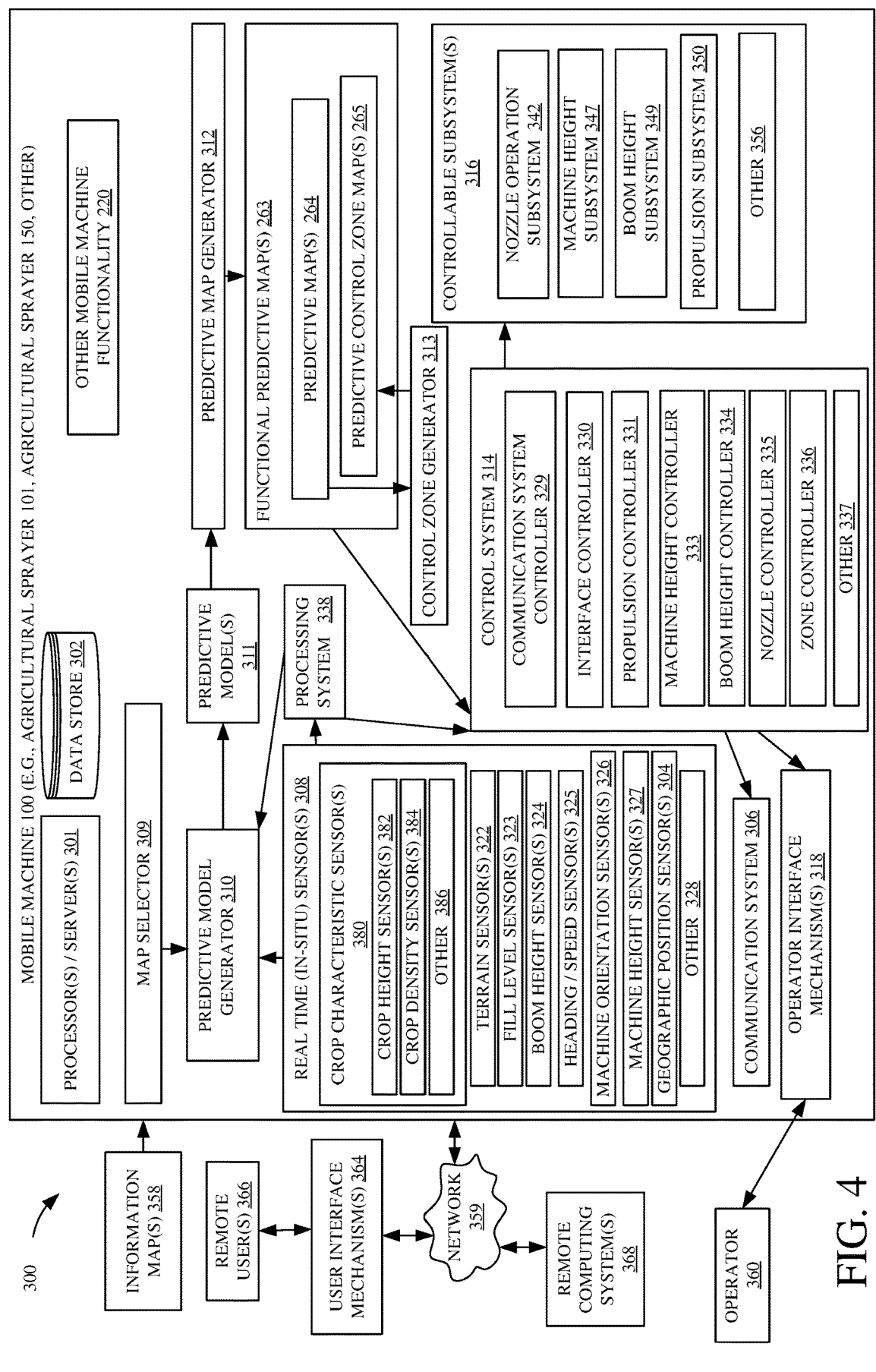
FIG. 4 is a block diagram showing some portions of an agricultural spraying system, including a mobile machine, such as an agricultural sprayer, in more detail, according to some examples of the present disclosure.

FIG. 4 is a block diagram showing some portions of an agricultural spraying system architecture 300. FIG. 4 shows that agricultural spraying system architecture 300 includes mobile machine 100 (e.g., sprayer 101 or 150), one or more remote computing systems 368, one or more remote user interfaces 364, network 359, and one or more information maps 358. Mobile machine 100, itself, illustratively includes one or more processors or servers 301, data store 302, communication system 306, one or more in-situ sensors 308 that sense one or more characteristics at a worksite concurrent with an operation, and a processing system 338 that processes the sensors signals generated by in-situ sensors 308 to generate processed sensor data. The in-situ sensors 308 generate values corresponding to the sensed characteristics. Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and an operator interface mechanism 318. The mobile machine 100 can also include a wide variety of other machine functionality 320.

The in-situ sensors 308 can be on-board mobile machine 100, remote from mobile machine 100, such as deployed at fixed locations on the worksite or on another machine operating in concert with mobile machine 100, such as an aerial vehicle, and other types of sensors, or a combination thereof. In-situ sensors 308 sense characteristics at a worksite during the course of an operation. In-situ sensors 308 illustratively include one or more crop characteristic sensors 380, one or more terrain sensors 322, one or more fill level sensors 323, one or more boom height sensors 324, one or more heading/speed sensors 325, one or more machine orientation sensors 326, one or more machine height sensors 327, one or more terrain sensors 328, one or more geographic position sensors 304, and can include various other sensors 328. Crop characteristic sensors 380 can include crop height sensors 382, crop density sensors 384, and can include other sensors 386 as well.

Geographic position sensors 304 illustratively sense or detect the geographic position or location of mobile machine 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors. In some examples, the geographic position or location detected by geographic position sensors 304 can be processed to derive a geographic position or location of a given component of mobile machine 100, such as the geographic position or location of an individual section of a boom or the geographic position or location of an individual spray nozzle. The dimensions of the mobile machine, such as the distance of certain components from the geographic position sensors 304, which can be stored in data store 302 or otherwise provided, can be used, in combination with detected geographic position or location, to derive the geographic position or location of the component. This processing can be implemented by processing system 338.

Crop characteristic sensors 380 sense characteristics of crop at the worksite at which mobile machine 100 is operating. Crop characteristic sensors 380 can include one or more of imaging systems, such as a camera (e.g., stereo camera or mono camera), optical sensors, lidar, radar, ultrasound, sonar, as well as a variety of other types of sensors.

Crop characteristics sensors 380 include crop height sensors 382. Crop height sensors 382 illustratively detect a height of crop at the worksite at which mobile machine 100 is operating. In some examples, crop height sensors 382 also utilize topographic information (e.g., ground truthing or elevation data) for the location at which the crop height is being detected. This information can be derived from a topographic map of the worksite and/or from sensor data from geographic position sensors 304 or terrain sensors 322, along with machine dimensions and location of the geographic position sensor. As an illustrative example, the crop may measure 5 feet high by the crop height sensor 382, but the elevation at the location of the crop may be 2 feet higher than at the location of the sensor. In such an example, the elevation difference at the location of the detected crop (2 feet) may be subtracted from the detected crop height (5 feet) to generate a crop height value of 3 feet. Such processing may be performed by processing system 338.

Crop characteristics sensors 380 include crop density sensors 384. Crop density sensors 384 illustratively detect a density of crop at the worksite at which mobile machine 100 is operating. In some examples, crop density values can be derived from a count of individual crop plants in the area of interest detected by the crop density sensors 384. In other examples, crop density values can be derived by calculating the space of the detected area occupied by crop matter. For instance, the crop density sensor 384 may have a field of view with a given depth and width. The depth and width, along with the height of the crop, can be used to calculate a volume of the detected area. The amount of that volume occupied by crop matter can be calculated to estimate a crop density. Such processing may be performed by processing system 338.

In some examples, crop height sensors 382 and crop density sensors 384 may be the same sensor, that is, the crop height and crop density can be derived based on sensor data from the same sensor. In other examples, the crop height sensors 382 and crop density sensors 384 may be separate.

Heading/speed sensors 325 detect a heading and speed at which mobile machine is traversing the worksite during the operation. This can include sensors that sense the movement of ground-engaging elements (e.g., wheels or tracks 123, 124, 160, etc.) or can utilize signals received from other sources, such as geographic position sensor 304, thus, while heading/speed sensors 325 as described herein are shown as separate from geographic position sensor 304, in some examples, machine heading/speed is derived from signals received from geographic positions sensors and subsequent processing. In other examples, heading/speed sensors 325 are separate sensors and do not utilize signals received from other sources.

Terrain sensors 322 illustratively detect terrain characteristics of the worksite at which mobile machine 100 is operating, such as a terrain surface profile (e.g., slope) of the worksite around mobile machine 100. Terrain sensors 322 may include imaging systems, such as cameras (e.g., stereo cameras), optical sensors, lidar, radar, ultrasound, sonar, as well as various other types of sensors. Terrain data can be used to predict machine orientation at areas of the worksite ahead of (or around) mobile machine 100. In some examples, terrain sensors 322 may be the same as (or otherwise utilize data from) crop characteristic sensors 380, that is, the terrain data can also be derived based on sensor data from crop characteristic sensors 380. In other examples, terrain sensors 322 may be separate. Terrain sensors 322 can include inertial measurement units (IMUs), accelerometers, gyroscopes, magnetometers, as well as various sensors, which may detect machine dynamics, such as an orientation (e.g., pitch, roll, and yaw) of the machine which can be used, in combination with other data (e.g., machine dimensions), to derive a terrain profile.

In some examples, instead of, or in addition to terrain sensors, agricultural spraying system 300 may obtain a map of the field that includes terrain values across different geographic locations in the field, such as a topographic map.

Fill level sensors 323 illustratively detect a fill level of the product tank (e.g., 104, 155, etc.) of mobile machine 100. Fill level sensors may include float gauges, capacitive or inductive sensors, as well as a variety of other suitable fill level sensors.

Boom height sensors 324 illustratively detect a height of the boom of mobile machine 100 above the worksite at which mobile machine 100 is operating or above crops at the worksite. Boom height sensors 324 may include imaging systems, such as cameras (e.g., stereo or mono cameras), optical sensors, lidar, radar, ultrasound, sonar, as well as various other types of sensors. In some examples, boom height sensors may be the same as (or otherwise utilize data from) crop characteristic sensors 380, that is, the boom height can also be derived based on sensor data from crop characteristic sensors 380. In other examples, boom height sensors may be separate from crop characteristic sensors 380.

Machine orientation sensors 326 illustratively detect machine orientation characteristics (e.g., pitch, roll, and yaw) of mobile machine 100 at the worksite. Machine orientation sensors 326 can include one or more inertial measurement units (IMUs). The one or more IMUs can include accelerometers, gyroscopes, and magnetometers.

Machine height sensors 327 illustratively detect a height of the main frame (e.g., 156 or main frame of implement 118, etc.) of mobile machine 100 above the worksite at which mobile machine 100 operates or above crops at the worksite. Machine height sensors 327 can include imaging systems, such as cameras (e.g., stereo or mono cameras), or can include other types of sensors such as lidar, radar, ultrasound, sonar, as well as various other sensors. In some examples, machine height sensors 327 may be mounted at a given position on mobile machine (such as to the main frame) and detect the surface of the worksite. In other examples, machine height sensors 327 may include sensors that detect the operating parameters of the machine height actuators (e.g., displacement of the machine actuator, fill or pressure of air bags, etc.), along with various other data (e.g., geographic position data, terrain/topography, machine orientation, machine dimensions, etc.) to derive machine height. In some examples, machine height sensors 327 may detect a distance between the main frame and another component of the mobile machine 100, such as an axle or ground engaging element.

Other in-situ sensors 328 can be on-board mobile machine 100 or can be remote from mobile machine 100, such as other in-situ sensors 328 on-board another mobile machine that capture in-situ data at the worksite or sensors at fixed locations throughout the worksite. The remote data from remote sensors can be obtained by mobile machine 100 via communication system 306 over network 359. Some examples of other sensors 328 are flow rate sensors, such as flowmeters, pressure sensors, such as pressure transducers.

In-situ data includes data taken from a sensor on-board the mobile machine 100 or taken by any sensor where the data are detected during the operation of mobile machine 100 at a field.

Processing system 338 processes the sensor data (e.g., signals, images, etc.) generated by in-situ sensors 308 to generate processed sensor data indicative of the sensed variables. For example, processing system 338 generates processed sensor data indicative of sensed variable values based on the sensor data generated by in-situ sensors, such as crop characteristic values based on sensor data generated by crop characteristic sensors 380. For example, processing system 338 generates processed sensor data indicative of crop height values based on sensor data generated by crop height sensors 382. In another example, processing system 338 generates processed sensor data indicative of crop density values based on sensor data generated by crop density sensors 384. Additionally, processing system 338 can generate processed sensor data indicative of other sensed variable values such as geographic location values based on sensor data generated by geographic position sensors 304, terrain values based on sensor data generated by terrain sensors 322, fill level values based on sensor data generated by fill level sensors 323, boom height values based on sensor data generated by boom height sensors 324, machine speed (travel speed, acceleration, deceleration, etc.) values or heading values, or both, based on sensor data generated by heading/speed sensors 325, machine orientation values based on sensor data generated by machine orientation sensors 326, machine height values based on sensor data generated by machine height sensors 327, as well as various other values based on sensors signals generated by various other in-situ sensors 328. It will also be understood that in generating processed sensor data and the variable values, processing system 338 can utilize sensor data from multiple different sensors.

It will be understood that processing system 338 can be implemented by one or more processers or servers, such as processors or servers 301. Additionally, processing system 338 can utilize various sensor signal filtering techniques, noise filtering techniques, sensor signal categorization, aggregation, normalization, as well as various other processing functionalities. Similarly, processing system 338 can utilize various image processing techniques such as, sequential image comparison, RGB color extraction, edge detection, black/white analysis, machine learning, neural networks, pixel testing, pixel clustering, shape detection, as well any number of other suitable image processing and data extraction functionalities.

FIG. 4 shows that an operator 360 may operate mobile machine 100. The operator interacts with operator interface mechanisms 318. In some examples, operator interface mechanisms 318 may include joysticks, levers, a steering wheel, linkages, pedals, buttons, key fobs, wireless devices, such as mobile computing devices, dials, keypads, a display device with actuatable display elements (such as icons, buttons, etc.), a microphone and speaker (where speech recognition and speech synthesis are provided), among a wide variety of other types of control devices. Where a touch sensitive display system is provided, operator 360 may interact with operator interface mechanisms 318 using touch gestures. These examples described above are provided as illustrative examples and are not intended to limit the scope of the present disclosure. Consequently, other types of operator interface mechanisms 318 may be used and are within the scope of the present disclosure.

FIG. 4 also shows one or more remote users 366 interacting with mobile machine 100 or remote computing systems 368, or both, through user interface mechanisms 364 over network 359. User interface mechanisms 364 can include joysticks, levers, a steering wheel, linkages, pedals, buttons, key fobs, wireless devices, such as mobile computing device, dials, keypads, a display device with actuatable display elements (such as icons, buttons, etc.), a microphone and speaker (where speech recognition and speech synthesis are provided), among a wide variety of other types of control devices. Where a touch sensitive display system is provided, a remote user 364 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, mobile machine 100 can be controlled remotely by remote computing systems 368 or by remote users 366, or both. As will be described below, in some examples, one or more of the components shown being disposed on mobile machine 100 in FIG. 4 can be located elsewhere, such as at remote computing systems 368 and/or user interface mechanisms 364, as well as various other locations.

Control system 314 includes communication system controller 329, operator interface controller 330, propulsion controller 331, machine height controller 333, boom height controller 334, nozzle controller 335, zone controller 336, and control system 314 can include other items 337, such as various other controllers. Controllable subsystems 316 include nozzle operation subsystem 342, machine height subsystem 347, boom height subsystem 349, propulsion subsystem 350, and controllable subsystems 316 can include a wide variety of other controllable subsystems 356.

Nozzle operation subsystem 342 illustratively includes a plurality of spray nozzles (e.g., 108, 158, 208, etc.) as well as associated controllable valves. The controllable valves can be activated or deactivated to controllably activate and deactivate select spray nozzles. For instance, in the example of the multi-spray nozzle assembly 203, one or more controllable valves can be controlled to switch between (deactivate one nozzle 208 and activate another nozzle 208) the plurality of nozzles 208-1 through 208-6. In this way, the spray pattern and corresponding dispersal area can be adjusted.

Machine height subsystem 347 illustratively includes a plurality of machine height actuators, such as hydraulic actuators, pneumatic actuators (e.g., inflatable and deflatable air bags, as well as other types of pneumatic actuators), electromechanical actuators, as well as various other types of actuators. The machine height actuators can be controllably adjusted to vary a height of the mobile machine 100 above a surface of the worksite (e.g., vary a height of a frame of the mobile machine 100 above the worksite). In some examples, a machine height actuator can be disposed between an axle and the frame of the mobile machine 100. The machine height subsystem 347 includes respective supply elements (e.g., hydraulic fluid source and hydraulic pump, air compressor, electric motor, etc.), as well as, in some examples, one or more controllable valves, to controllably adjust the respective actuators. In the example of a hydraulic actuator, hydraulic fluid can be controllably supplied to or withdrawn from the hydraulic actuator to control extension and retraction of the hydraulic actuator. In the example of a pneumatic actuator, air can be controllably supplied to or withdrawn from the pneumatic actuator to control the extension and retraction of the pneumatic actuator. For instance, in the case of air bags, the air bags can be supplied with additional air to inflate (and thus extend or expand) or air can be withdrawn from the air bags to deflate (and thus retract or shrink) the air bags. In the example of an electromechanical actuator, the rotation of the electric motor can be controlled to extend or retract the electromechanical actuator. Various other forms of actuators and corresponding supply elements can be used.

Boom height subsystem 349 illustratively includes one or more boom height actuators, such as hydraulic actuators, pneumatic actuators, electromechanical actuators, as well as various other types of actuators. The boom height actuators can be controllably adjusted to vary a height of the boom (e.g., 110, 154, 202, etc.), or individual boom arms (e.g., 112, 114 or 162, 164), or individual boom sections, above the worksite at which mobile machine 100 is operating. In some examples, one or more boom height actuators controllable extend and retract to actuate movement of a center frame (e.g., 116 or 166) to which the boom arms are coupled to controllably vary a height of the boom above the worksite. In some examples, the boom arms are pivotally coupled to the center frame and a respective boom height actuator extends and retracts to rotate its respective boom arm to adjust the height of the boom arm above the worksite. In some examples, each boom arm includes multiple sections, the first pivotally coupled to the center frame, and the subsequent sections each pivotally coupled to the preceding section. Each section includes a respective boom height actuator that extends and retracts to rotate its respective section to adjust the height of the section above the worksite.

The boom height subsystem 349 also includes supply elements appropriate for the particular type of actuators as well as, in some examples, one or more controllable valves, to controllably adjust the respective actuators.

Propulsion subsystem 350 illustratively includes the mobile machine powertrain, which includes a power plant (e.g., 121, 162, etc.) and drivetrain elements (cumulatively a powertrain). The operating parameters of the propulsion subsystem 350 can be controlled to adjust a speed characteristic (e.g., travel speed, acceleration, deceleration, etc.) of the mobile machine 100.

FIG. 4 also shows that mobile machine 100 can obtain one or more information maps 358. As described herein, the information maps 358 include, for example, a vegetative index map and a seeding map. However, information maps 358 may also encompass other types of data, such as other types of data that were obtained prior to a spraying operation or a map from a prior operation. Additionally, information maps 358 may also encompass other types of maps that provide the same data but are derived from a different source. For example, crop variety or crop genotype data may be provided in ways other than in the form of a seeding map. In other examples, information maps 358 can be generated during a current operation, such a map generated by predictive map generator 312 based on a predictive model 311 generated by predictive model generator 310.

Information maps 358 may be downloaded onto mobile machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks. Network 359 illustratively represents any or a combination of any of the variety of networks. Communication system 306 may also include a system that facilitates downloads or transfers of information to and from a secure digital (SD) card or a universal serial bus (USB) card or both.

Predictive model generator 310 generates a model that is indicative of a relationship between the values sensed by the in-situ sensors 308 and a value mapped to the field by the information maps 358. For example, if the information map 358 maps vegetative index values to different locations in the worksite, and the in-situ sensor 308 (e.g., crop characteristic sensor 380) is sensing values indicative of crop characteristics (e.g., crop height values, crop density values, etc.), then model generator 310 generates a predictive crop characteristic model (e.g., predictive crop height model, predictive crop density model, etc.) that models the relationship between the vegetative index values and the crop characteristic values (e.g., crop height values, crop density values, etc.). In another example, if the information map 358 maps seeding characteristic values (e.g., population values, genotype values, etc.) to different locations in the worksite, and the in-situ sensor 308 is sensing values indicative of crop characteristics (e.g., crop height values, crop density values, etc.), then model generator 310 generates a predictive crop characteristic model (e.g., predictive crop height model, predictive crop density model, etc.) that models the relationship between the seeding characteristic values (e.g., population values, genotype values, etc.) and the crop characteristic values (e.g., crop height values, crop density values, etc.). In another example, if the information map 358 maps other characteristic values to different locations in the field, and the in-situ sensor 308 is sensing values indicative of crop characteristic, then model generator 310 generates a predictive crop characteristic model that models the relationship between the other characteristic values and the crop characteristic values.

In some examples, the predictive map generator 312 uses the predictive models generated by predictive model generator 310 to generate one or more functional predictive maps 263 that predict the value of a characteristic, such as crop characteristic values (e.g., crop height values, crop density values, etc.), sensed by the in-situ sensors 308 at different locations in the worksite based upon one or more of the information maps 358. For example, where the predictive model is a predictive crop characteristic model that models a relationship between crop characteristic values sensed by crop characteristic sensors 380 and one or more of vegetative index values from a vegetative index map, seeding characteristic values from a seeding map, and other characteristic values from another type of information map, then predictive map generator 312 generates a functional predictive crop characteristic map that predicts crop characteristic values at different locations at the worksite field based on one or more of the vegetative index values, the seeding characteristic values, and the other characteristic values at those locations and the predictive crop characteristic model.

In some examples, the type of values in the functional predictive map 263 may be the same as the in-situ data type sensed by the in-situ sensors 308. In some instances, the type of values in the functional predictive map 263 may have different units from the data sensed by the in-situ sensors 308. In some examples, the type of values in the functional predictive map 263 may be different from the data type sensed by the in-situ sensors 308 but have a relationship to the type of data type sensed by the in-situ sensors 308. For example, in some examples, the data type sensed by the in-situ sensors 308 may be indicative of the type of values in the functional predictive map 263. In some examples, the type of data in the functional predictive map 263 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 308 and the data type in the information maps 358. In some examples, the type of data in the functional predictive map 263 is the same as one of, or both of, of the in-situ data type sensed by the in-situ sensors 308 and the data type in information maps 358. In some examples, the type of data in the functional predictive map 263 is the same as one of the in-situ data type sensed by the in-situ sensors 308 or the data type in the information maps 358, and different than the other.

As an example, the information map 358 can be a vegetative index map and the in-situ sensor 308 is a crop characteristic sensor 380 (e.g., crop height sensor 382, crop density sensor 384, etc.) that senses a value indicative of a crop characteristic (e.g., crop height, crop density, etc.), predictive map generator 312 can use the vegetative index values in information map 358, and the model generated by predictive model generator 310, to generate a functional predictive map 263 that predicts the crop characteristic value at different locations in the field. Predictive map generator 312 thus outputs predictive map 264. In another example, the information map can be a seeding characteristic map and the in-situ sensor 308 is a crop characteristic sensor 380 (e.g., crop height sensor 382, crop density sensor 384, etc.) that senses a value indicative of a crop characteristic (e.g., crop height, crop density, etc.), predictive map generator 312 can use the seeding characteristic values in information map 358, and the model generated by predictive model generator 310, to generate a functional predictive map 263 that predicts the crop characteristic value at different locations in the field. Predictive map generator 312 thus outputs predictive map 264.

As shown in FIG. 3, predictive map 264 predicts the value of a sensed characteristic (sensed by in-situ sensors 308), or a characteristic related to the sensed characteristic, at various locations across the worksite based upon one or more information values in one or more information maps 358 at those locations and using the predictive model. For example, if predictive model generator 310 has generated a predictive model indicative of a relationship between vegetative index values and crop characteristic values (e.g., crop height values, crop density values, etc.), then, given the vegetative index value at different locations across the worksite, predictive map generator 312 generates a predictive map 264 that predicts crop characteristic values at those different locations across the worksite. The vegetative index value, obtained from the vegetative index map, at those locations and the relationship between vegetative index values and crop characteristic values, obtained from the predictive model, are used to generate the predictive map 264. In another example, if predictive model generator 310 has generated a predictive model indicative of a relationship between seeding characteristic values and crop characteristic values (e.g., crop height values, crop density values, etc.), then, given the seeding characteristic value at different locations across the worksite, predictive map generator 312 generates a predictive map 264 that predicts crop characteristic values at those different locations across the worksite. The seeding characteristic value, obtained from the seeding map, at those locations and the relationship between seeding characteristic values and crop characteristic values, obtained from the predictive model, are used to generate the predictive map 264

Some variations in the data types that are mapped in the information maps 358, the data types sensed by in-situ sensors 308, and the data types predicted on the predictive map 264 will now be described.

In some examples, the data type in one or more information maps 358 is different from the data type sensed by in-situ sensors 308, yet the data type in the predictive map 264 is the same as the data type sensed by the in-situ sensors 308. For instance, the information map 358 may be a vegetative index map, and the variable sensed by the in-situ sensors 308 may be a crop characteristic, such as crop height or crop density. The predictive map 264 may then be a predictive crop characteristic map, such as predictive crop height map or predictive crop density map, that maps predictive crop characteristic values, such as predictive crop height values or predictive crop density values, to different geographic locations in the in the worksite.

Also, in other examples, the data type in the information map 358 is different from the data type sensed by in-situ sensors 308, and the data type in the predictive map 264 is different from both the data type in the information map 358 and the data type sensed by the in-situ sensors 308.

In other examples, the information map 358 is from a prior pass through the field during a prior operation and the data type is different from the data type sensed by in-situ sensors 308, yet the data type in the predictive map 264 is the same as the data type sensed by the in-situ sensors 308. For instance, the information map 358 may be a seeding characteristic map generated during a previous planting operation on the worksite, and the variable sensed by the in-situ sensors 308 may be a crop characteristic. The predictive map 264 may then be a predictive crop characteristic map that maps predictive crop characteristic values to different geographic locations in the worksite.

In some examples, the information map 358 is from a prior pass through the field during a prior operation and the data type is the same as the data type sensed by in-situ sensors 308, and the data type in the predictive map 264 is also the same as the data type sensed by the in-situ sensors 308. For instance, the information map 358 may be a crop characteristic map generated during a previous year, and the variable sensed by the in-situ sensors 308 may be a crop characteristic. The predictive map 264 may then be a predictive crop characteristic map that maps predictive crop characteristic values to different geographic locations in the field. In such an example, the relative crop characteristic differences in the georeferenced information map 358 from the prior year can be used by predictive model generator 310 to generate a predictive model that models a relationship between the relative crop characteristic differences on the information map 358 and the crop characteristic values sensed by in-situ sensors 308 during the current operation. The predictive model is then used by predictive map generator 310 to generate a predictive crop characteristic map. In another example, the information map 358 may be a crop characteristic map generated earlier in the same year, and the variable sensed by the in-situ sensors 308 may be a crop characteristic. The predictive map 264 may then be a predictive crop characteristic map that maps predictive crop characteristic values to different geographic locations in the field. In such an example, the relative crop characteristic differences in the georeferenced information map 358 from earlier in the same year can be used by predictive model generator 310 to generate a predictive model that models a relationship between the relative crop characteristic differences on the information map 358 and the crop characteristic values sensed by in-situ sensors 308 during the current operation. The predictive model is then used by predictive map generator 310 to generate a predictive crop characteristic map.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems 316 may be inadequate to satisfactorily respond to changes in values contained in a map, such as predictive map 264. In that case, control zone generator 313 parses the map and identifies control zones that are of a defined size to accommodate the response time of the controllable subsystems 316. In another example, control zones may be sized to reduce wear from excessive actuator movement resulting from continuous adjustment. In some examples, there may be a different set of control zones for each controllable subsystem 316 or for groups of controllable subsystems 316. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crop genotypes (e.g., species, hybrids, cultivars, etc.) may be simultaneously present in a field. In that case, predictive map generator 312 and control zone generator 313 are able to identify the location and characteristics of the two or more crop genotypes and then generate predictive map 264 and predictive map with control zones 265 accordingly.

It will also be appreciated that control zone generator 313 can cluster values to generate control zones and the control zones can be added to predictive control zone map 265, or a separate map, showing only the control zones that are generated. In some examples, the control zones may be used for controlling or calibrating mobile machine 100 or both. In other examples, the control zones may be presented to the operator 360 or a user 366, or both, and used to control or calibrate mobile machine 100, and, in other examples, the control zones may be presented to the operator 360 or another user, such as a remote user 366, or stored for later use.

Predictive map 264 or predictive control zone map 265, or both, are provided to control system 314, which generates control signals based upon the predictive map 264 or predictive control zone map 265 or both. In some examples, communication system controller 329 controls communication system 306 to communicate the predictive map 264 or predictive control zone map 265 or control signals based on the predictive map 264 or predictive control zone map 265 to other mobile machines that are operating at the same worksite or in the same operation. In some examples, communication system controller 329 controls the communication system 306 to send the predictive map 264, predictive control zone map 265, or both to other remote systems, such as remote computing systems 368.

Communication system controller 329 is operable to generate control signals to control communication system 306 to communicate predictive map 264 or predictive control zone map 265, or both, or the data therefrom, to other systems, such as user interface mechanisms 364, remote computing systems 368, as well as various other systems, such as other mobile machines operating at the worksite. Additionally, communication system controller 329 is operable to generate control signals to control communication system 306 to communicate control signal (or data indicative of control commands) generated by other controllers of control system 314 to other systems, such as user interface mechanisms 364, remote computing systems 368, as well as various other systems, such as other mobile machine operating at the worksite.

Interface controller 330 is operable to generate control signals to control interface mechanisms, such as operator interface mechanisms 318 or user interface mechanisms 364, or both. The interface controller 330 is also operable to present the predictive map 264 or predictive control zone map 265, or both, or other information derived from or based on the predictive map 264, predictive control zone map 265, or both, to operator 360 or a remote user 366, or both. Operator 360 may be a local operator or a remote operator. As an example, interface controller 330 generates control signals to control a display mechanism to display one or both of predictive map 264 and predictive control zone map 265 for the operator 360 or a remote user 366, or both. Interface controller 330 may generate operator or user actuatable mechanisms that are displayed and can be actuated by the operator or user to interact with the displayed map. The operator or user can edit the map by, for example, correcting a value displayed on the map, based on the operator's or the user's observation or desire.

Propulsion controller 331 illustratively generates control signals to control propulsion subsystem 350 to control a speed setting, such as one or more of travel speed, acceleration, and deceleration, based on the predictive map 264, the predictive control zone map 265, or both.

Machine height controller 333 illustratively generates control signals to control machine height subsystem 347 (e.g., to control one or more machine height actuators of machine height subsystem 347) to control a machine height setting, that is, a height of the mobile machine 100 (or a frame of the mobile machine 100) above the worksite at which mobile machine 100 operates, based on the predictive map 264, the predictive control zone map 265, or both.

Boom height controller 335 illustratively generates control signals to control boom height subsystem 349 (e.g., to control one or more boom height actuators of machine height subsystem 347) to control a boom height setting, such as a height of the boom of mobile machine 100, a height of individual boom arms of mobile machine 100, or a height of individual boom sections of mobile machine 100, above the worksite at which mobile machine 100 operates, based on the predictive map 264, the predictive control zone map 265, or both.

Nozzle controller 335 illustratively generates control signals to control nozzle operation subsystem 347 (e.g., to control one or more valves of nozzle operation subsystem 347) to activate and deactivate spray nozzles of mobile machine 100, such as spray nozzles 208 of multi-spray nozzle assembly 203, based on the predictive map 264, the predictive control zone map 265, or both.

Zone controller 336 illustratively generates control signals to control one or more controllable subsystems 316 to control operation of the one or more controllable subsystems 316 based on the predictive control zone map 265.

Other controllers 337 included on the mobile machine 100, or at other locations in agricultural spraying system 300, can control other subsystems based on one or more of the predictive map 264 and the predictive control zone map 265.

While the illustrated example of FIG. 4 shows that various components of agricultural spraying system architecture 300 are located on mobile machine 100, it will be understood that in other examples one or more of the components illustrated on mobile machine 100 in FIG. 4 can be located at other locations, such as one or more remote computing systems 368 or user interface mechanisms 364. For instance, one or more of data stores 302, map selector 309, predictive model generator 310, predictive model 311, predictive map generator 312, functional predictive maps 263 (e.g., 264 and 265), and control zone generator 313, can be located remotely from mobile machine 100 but can communicate with or be communicated to mobile machine 100 via communication system 306 and network 359. Thus, the predictive models 311 and functional predictive maps 263 may be generated at remote locations away from mobile machine 100 and be communicated to mobile machine 100 over network 359, for instance, communication system 306 can download the predictive models 311 and functional predictive maps 263 from the remote locations and store them in data store 302. In other examples, mobile machine 100 may access the predictive models 311 and functional predictive maps 263 at the remote locations without downloading the predictive models 311 and functional predictive maps 263. The information used in the generation of the predictive models 311 and functional predictive maps 263 may be provided to the predictive model generator 310 and the predictive map generator 312 at those remote locations over network 359, for example in-situ sensor data generator by in-situ sensors 308 can be provided over network 359 to the remote locations. Similarly, information maps 358 can be provided to the remote locations. These are merely examples.

In some examples, control system 314 can be located remotely from mobile machine 100 such as at one or more of remote computing systems 368 and remote user interface mechanisms 364. In other examples, a remote location, such as remote computing systems 368 or user interface mechanisms 364, or both, may include a respective control system which generates control values that can be communicated to mobile machine 100 and used by on-board control system 314 to control the operation of mobile machine 100. These are merely examples.

Figure 5:
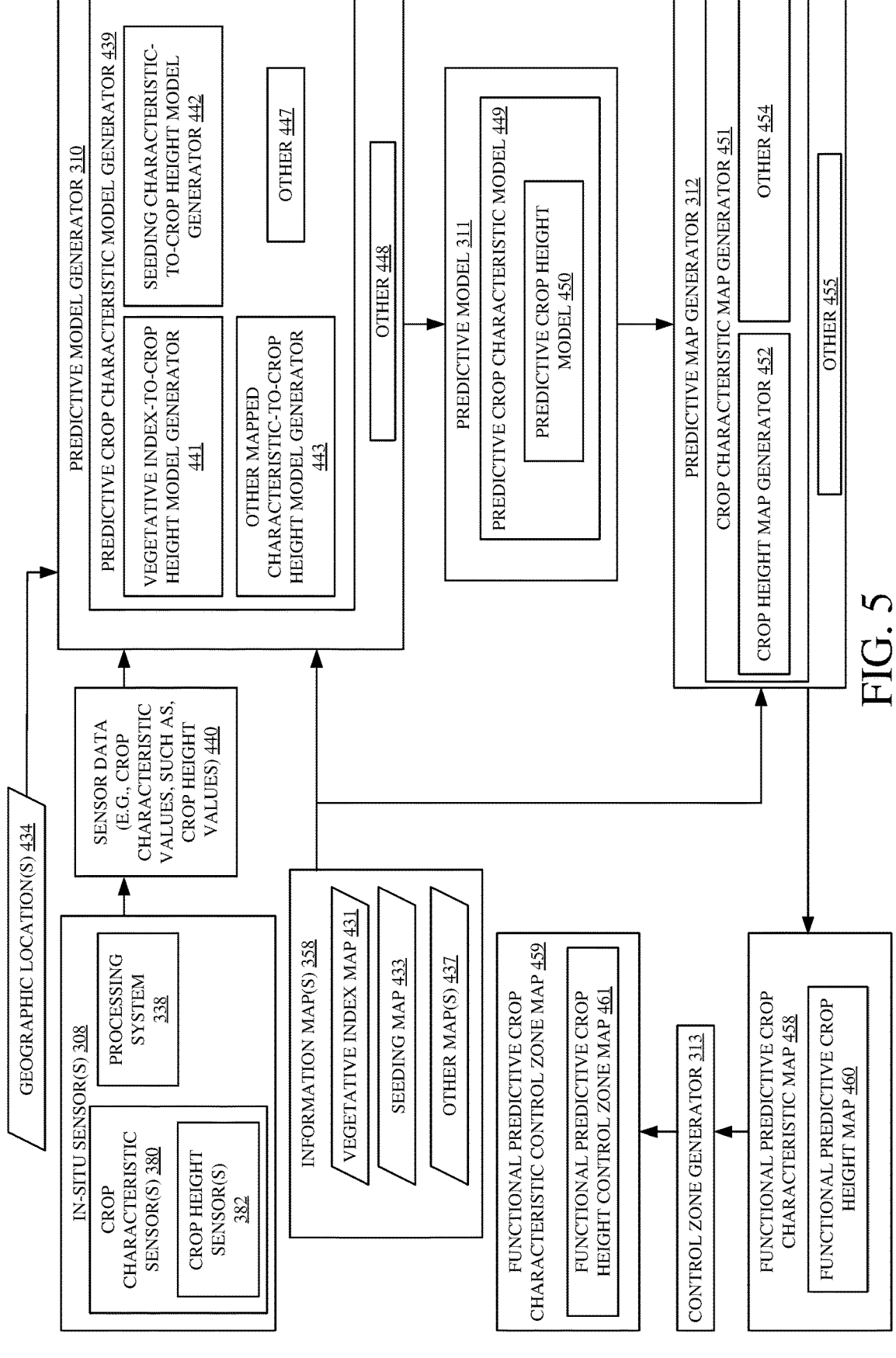
FIG. 5 is a block diagram showing one example of a predictive model generator and predictive map generator.

FIG. 5 is a block diagram of a portion of the agricultural spraying system architecture 300 shown in FIG. 4. Particularly, FIG. 5 shows, among other things, examples of the predictive model generator 310 and the predictive map generator 312 in more detail. FIG. 5 also illustrates information flow among the various components shown. The predictive model generator 310 receives one or more of a vegetative index map 431, a seeding map 433, and another type of map 437. Predictive model generator 310 also receives one or more geographic locations 434, or an indication of one or more geographic locations, from a geographic position sensor 304, indicative of one or more geographic locations at the worksite corresponding to values detected by in-situ sensors 308. In-situ sensors 308 illustratively include crop height sensors 382, as well as a processing system 338. In some instances, crop height sensors 382 may be located on-board mobile machine 100. The processing system 338 processes sensor data generated from crop height sensors 382 to generate processed sensor data 440 indicative of crop height values. While the example shown in FIG. 5 illustrates processing system 338 as a component of in-situ sensors 308, in other examples, such as the example shown in FIG. 4, processing system 338 can be separate from in-situ sensors 308 but in operative communication with in-situ sensors 308.

It will be understood that in some examples, the geographic location detected by geographic position sensor 304 may not directly indicate the geographic location at the worksite to which the detected value corresponds. For instance, a crop height value may be detected by a crop height sensor 382 that is a given distance away from the geographic position sensor 304. In that case, the geographic location detected and provided by geographic position sensor 304 can be processed to derive a geographic location of the particular crop height sensor 382 such that the detected crop height value can be more precisely georeferenced. The distance between the crop height sensor 382 and geographic position sensor 304 can be known and stored in a data store.

In any case, it will be understood that geographic locations 434 illustratively represented geographic locations on the worksite to which the detected values correspond.

As shown in FIG. 5, the example predictive model generator 310 includes a predictive crop characteristic model generator 439. Predictive crop characteristic model generator includes one or more of a vegetative index-to-crop height model generator 441, a seeding characteristic-to-crop height model generator 442, and an other mapped characteristic-to-crop height model generator 443. In other examples, the predictive crop characteristic generator 439 may include additional or different components than those shown in the example of FIG. 5. Consequently, in some examples, predictive crop characteristic model generator 439 may include other items 447, which may include other types of predictive crop characteristic model generators to generate other types of predictive crop characteristic models. In other examples, the predictive model generator 310 may include additional or different components than those shown in the example of FIG. 5. Consequently, in some examples, the predictive model generator 310 may include other items 448 as well, which may include other types of predictive model generators to generate other types of models.

Vegetative index-to-crop height model generator 441 identifies a relationship between crop height values detected in in-situ sensor data 440 and vegetative index values, from the vegetative index map 431, corresponding to the geographic location of the detected crop height values. Based on this relationship established by vegetative index-to-crop height model generator 441, vegetative index-to-crop height model generator 441 generates a predictive crop height model. The predictive crop height model is used by crop height map generator 452 to predict values of crop height (or the sensor values indicative of crop height values) at different locations in the worksite based upon the georeferenced vegetative index values contained in the vegetative index map 431 at those different locations in the worksite. Thus, for a given location in the worksite, crop height can be predicted at the given location based on the predictive crop height model generated by vegetative index-to-crop height model generator 441 and the vegetative index value, from the vegetative index map 431, at that given location.

Seeding characteristic-to-crop height model generator 442 identifies a relationship between crop height values detected in in-situ sensor data 440 and seeding characteristic values (e.g., population values, genotype values, etc.) from the seeding map 433, corresponding to the geographic location of the detected crop height values. Based on this relationship established by seeding characteristic-to-crop height model generator 442, seeding characteristic-to-crop height model generator 442 generates a predictive crop height model. The predictive crop height model is used by crop height map generator 452 to predict values of crop height (or the sensor values indicative of crop height values) at different locations in the worksite based upon the georeferenced seeding characteristic values contained in the seeding map 433 at those different locations in the worksite. Thus, for a given location in the worksite, crop height can be predicted at the given location based on the predictive crop height model generated by seeding characteristic-to-crop height model generator 442 and the seeding characteristic value, from the seeding map 432, at that given location.

Other mapped characteristic-to-crop height model generator 443 identifies a relationship between crop height values detected in in-situ sensor data 440 and other mapped characteristic values from an other map 437, corresponding to the geographic location of the detected crop height values. Based on this relationship established by other mapped characteristic-to-crop height model generator 443, other mapped characteristic-to-crop height model generator generates a predictive crop height model. The predictive crop height model is used by crop height map generator 452 to predict values of crop height (or the sensor values indicative of crop height values) at different locations in the worksite based upon the georeferenced other characteristic values contained in the other map 437 at those different locations in the worksite. Thus, for a given location in the worksite, crop height can be predicted at the given location based on the predictive crop height model generated by other mapped characteristic-to-crop height model generator 443 and the other characteristic value, from the other map 437, at that given location.

In light of the above, the predictive model generator 310 is operable to produce a plurality of predictive crop height models, such as one or more of the predictive crop height models generated by model generators 441, 442, 443, and 447. In another example, two or more of the predictive models described above may be combined into a single predictive crop height model, such as a predictive crop height model that predicts crop height based upon two or more of the vegetative index values, the seeding characteristic values, and other mapped characteristic values at different locations in the field. Any of these crop height models, or combinations thereof, are represented collectively by predictive crop height model 450 in FIG. 5. Predictive crop height model 450 is an example of a predictive crop characteristic model 449 and predictive model 311.

The predictive crop height model 450 is provided to predictive map generator 312. In the example of FIG. 5, predictive map generator 312 includes a crop characteristic map generator 451. In other examples, predictive map generator 312 may include additional or different map generators. Thus, in some examples, predictive map generator 312 may include other items 455 which may include other types of map generators to generate other types of maps. Crop characteristic map generator includes a crop height map generator 452. In other examples, crop characteristic map generator 451 may include additional or different map generators. Thus, in some examples, crop characteristic map generator 451 may include other items 454 which may include other types of map generators to generate other types of crop characteristic maps.

Crop height map generator 452 receives one or more of the vegetative index map 431, the seeding characteristic map 433, and an other map 437 along with the predictive crop height model 450 which predicts crop height based upon one or more of a vegetative index value, a seeding characteristic value, and an other mapped characteristic value and generates a predictive map that maps predictive crop height values at different locations in the worksite.

Predictive map generator 312 outputs a functional predictive crop height map 460 that is predictive of crop height. The functional predictive crop height map 460 is an example of a functional predictive crop characteristic map 458 and is a predictive map 264. The functional predictive crop height map 460 predicts crop height values at different locations in a worksite. The functional predictive crop height map 460 may be provided to control zone generator 313, control system 314, or both. Control zone generator 313 generates control zones and incorporates those control zones into the functional predictive crop height map 460 to produce a predictive control zone map 265, that is, a functional predictive crop height control zone map 461. Functional predictive crop height control zone map 461 is an example of a functional predictive crop characteristic control zone map 459. One or both of functional predictive crop height map 460 and functional predictive crop height control zone map 461 can be provided to control system 314, which generates control signals to control one or more of the controllable subsystems 316 based upon the functional predictive crop height map 460, the functional predictive crop height control zone map 461, or both. Alternatively, or additionally, one or more of the functional predictive crop height map 460 and functional predictive crop height control zone map 461 can be provided to operator 360 on an operator interface mechanism 318 or to a remote user 366 on a user interface mechanism 364, or both.

Figure 6:
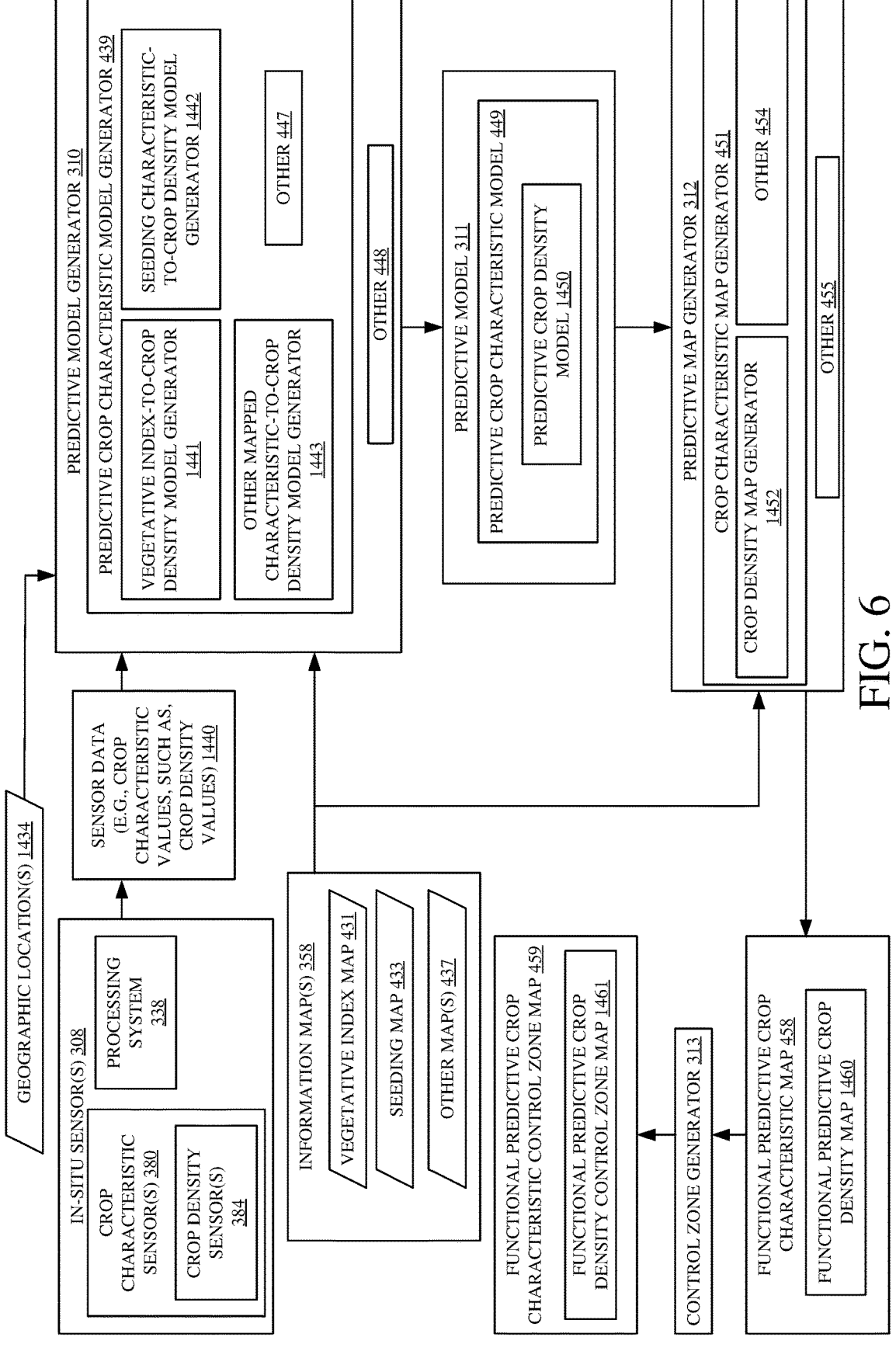
FIG. 6 is a block diagram showing one example of a predictive model generator and predictive map generator.

FIG. 6 is a block diagram of a portion of the agricultural spraying system architecture 300 shown in FIG. 4. Particularly, FIG. 6 shows, among other things, examples of the predictive model generator 310 and the predictive map generator 312 in more detail. FIG. 5 also illustrates information flow among the various components shown. The predictive model generator 310 receives one or more of a vegetative index map 431, a seeding map 433, and another type of map 437. Predictive model generator 310 also receives one or more geographic locations 1434, or an indication of one or more geographic locations, from a geographic position sensor 304, indicative of one or more geographic locations at the worksite corresponding to values detected by in-situ sensors 308. In-situ sensors 308 illustratively include crop density sensors 384, as well as a processing system 338. In some instances, crop density sensors 384 may be located on-board mobile machine 100. The processing system 338 processes sensor data generated from crop density sensors 384 to generate processed sensor data 1440 indicative of crop density values. While the example shown in FIG. 6 illustrates processing system 338 as a component of in-situ sensors 308, in other examples, such as the example shown in FIG. 4, processing system 338 can be separate from in-situ sensors 308 but in operative communication with in-situ sensors 308.

It will be understood that in some examples, the geographic location detected by geographic position sensor 304 may not directly indicate the geographic location at the worksite to which the detected value corresponds. For instance, a crop density value may be detected by a crop density sensor 384 that is a given distance away from the geographic position sensor 304. In that case, the geographic location detected and provided by geographic position sensor 304 can be processed to derive a geographic location of the particular crop density sensor 384 such that the detected crop density value can be more precisely georeferenced. The distance between the crop density sensor 384 and geographic position sensor 304 can be known and stored in a data store. In any case, it will be understood that geographic locations 1434 illustratively represented geographic locations on the worksite to which the detected values correspond.

As shown in FIG. 6, the example predictive model generator 310 includes a predictive crop characteristic model generator 439. Predictive crop characteristic model generator 439 includes one or more of a vegetative index-to-crop density model generator 1441, a seeding characteristic-to-crop density model generator 1442, and an other mapped characteristic-to-crop density model generator 1443. In other examples, the predictive crop characteristic model generator 439 may include additional or different components than those shown in the example of FIG. 6. Consequently, in some examples, predictive crop characteristic model generator 439 may include other items 447, which may include other types of predictive crop characteristic model generators to generate other types of predictive crop characteristic models. In other examples, the predictive model generator 310 may include additional or different components than those shown in the example of FIG. 5. Consequently, in some examples, the predictive model generator 310 may include other items 448 as well, which may include other types of predictive model generators to generate other types of models.

Vegetative index-to-crop density model generator 1441 identifies a relationship between crop density values detected in in-situ sensor data 1440 and vegetative index values, from the vegetative index map 431, corresponding to the geographic location of the detected crop density values. Based on this relationship established by vegetative index-to-crop density model generator 1441, vegetative index-to-crop density model generator 1441 generates a predictive crop density model. The predictive crop density model is used by crop density map generator 1452 to predict values of crop density (or the sensor values indicative of crop density values) at different locations in the worksite based upon the georeferenced vegetative index values contained in the vegetative index map 431 at those different locations in the worksite. Thus, for a given location in the worksite, crop density can be predicted at the given location based on the predictive crop density model generated by vegetative index-to-crop density model generator 1441 and the vegetative index value, from the vegetative index map 431, at that given location.

Seeding characteristic-to-crop density model generator 1442 identifies a relationship between crop density values detected in in-situ sensor data 440 and seeding characteristic values (e.g., population values, genotype values, etc.) from the seeding map 433, corresponding to the geographic location of the detected crop density values. Based on this relationship established by seeding characteristic-to-crop density model generator 1442, seeding characteristic-to-crop density model generator 1442 generates a predictive crop density model. The predictive crop density model is used by crop density map generator 1452 to predict values of crop density (or the sensor values indicative of crop density values) at different locations in the worksite based upon the georeferenced seeding characteristic values contained in the seeding map 433 at those different locations in the worksite. Thus, for a given location in the worksite, crop density can be predicted at the given location based on the predictive crop density model generated by seeding characteristic-to-crop density model generator 1442 and the seeding characteristic value, from the seeding map 432, at that given location.

Other mapped characteristic-to-crop density model generator 1443 identifies a relationship between crop density values detected in in-situ sensor data 1440 and other mapped characteristic values from an other map 437, corresponding to the geographic location of the detected crop density values. Based on this relationship established by other mapped characteristic-to-crop density model generator 1443, other mapped characteristic-to-crop density model generator 1443 generates a predictive crop density model. The predictive crop density model is used by crop density map generator 1452 to predict values of crop density (or the sensor values indicative of crop density values) at different locations in the worksite based upon the georeferenced other characteristic values contained in the other map 437 at those different locations in the worksite. Thus, for a given location in the worksite, crop density can be predicted at the given location based on the predictive crop density model generated by other mapped characteristic-to-crop density model generator 1443 and the other characteristic value, from the other map 437, at that given location.

In light of the above, the predictive model generator 310 is operable to produce a plurality of predictive crop density models, such as one or more of the predictive crop density models generated by model generators 1441, 1442, 1443, and 447. In another example, two or more of the predictive models described above may be combined into a single predictive crop density model, such as a predictive crop density model that predicts crop density based upon two or more of the vegetative index values, the seeding characteristic values, and other mapped characteristic values at different locations in the field. Any of these crop density models, or combinations thereof, are represented collectively by predictive crop density model 1450 in FIG. 6. Predictive crop density model 1450 is an example of a predictive crop characteristic model 449 and predictive model 311.

The predictive crop density model 1450 is provided to predictive map generator 312. In the example of FIG. 6, predictive map generator 312 includes a crop characteristic map generator 451. In other examples, predictive map generator 312 may include additional or different map generators. Thus, in some examples, predictive map generator 312 may include other items 455 which may include other types of map generators to generate other types of maps. Crop characteristic map generator includes a crop density map generator 1452. In other examples, crop characteristic map generator 451 may include additional or different map generators. Thus, in some examples, crop characteristic map generator 451 may include other items 454 which may include other types of map generators to generate other types of crop characteristic maps.

Crop density map generator 1452 receives one or more of the vegetative index map 431, the seeding characteristic map 433, and the other map 437 along with the predictive crop density model 1450 which predicts crop density based upon one or more of a vegetative index value, a seeding characteristic value, and an other mapped characteristic value and generates a predictive map that maps predictive crop density values at different locations in the worksite.

Predictive map generator 312 outputs a functional predictive crop density map 1460 that is predictive of crop density. The functional predictive crop density map 1460 is an example of a functional predictive crop characteristic map 458 and is a predictive map 264. The functional predictive crop density map 1460 predicts crop density values at different locations in a worksite. The functional predictive crop density map 1460 may be provided to control zone generator 313, control system 314, or both. Control zone generator 313 generates control zones and incorporates those control zones into the functional predictive crop density map 1460 to produce a predictive control zone map 265, that is, a functional predictive crop density control zone map 1461. Functional predictive crop density control zone map 1461 is an example of a functional predictive crop characteristic control zone map 459. One or both of functional predictive crop density map 1460 and functional predictive crop density control zone map 1461 can be provided to control system 314, which generates control signals to control one or more of the controllable subsystems 316 based upon the functional predictive crop density map 1460, the functional predictive crop density control zone map 1461, or both. Alternatively, or additionally, one or more of the functional predictive crop density map 1460 and functional predictive crop density control zone map 1461 can be provided to operator 360 on an operator interface mechanism 318 or to a remote user 366 on a user interface mechanism 364, or both.

Figure 7A:
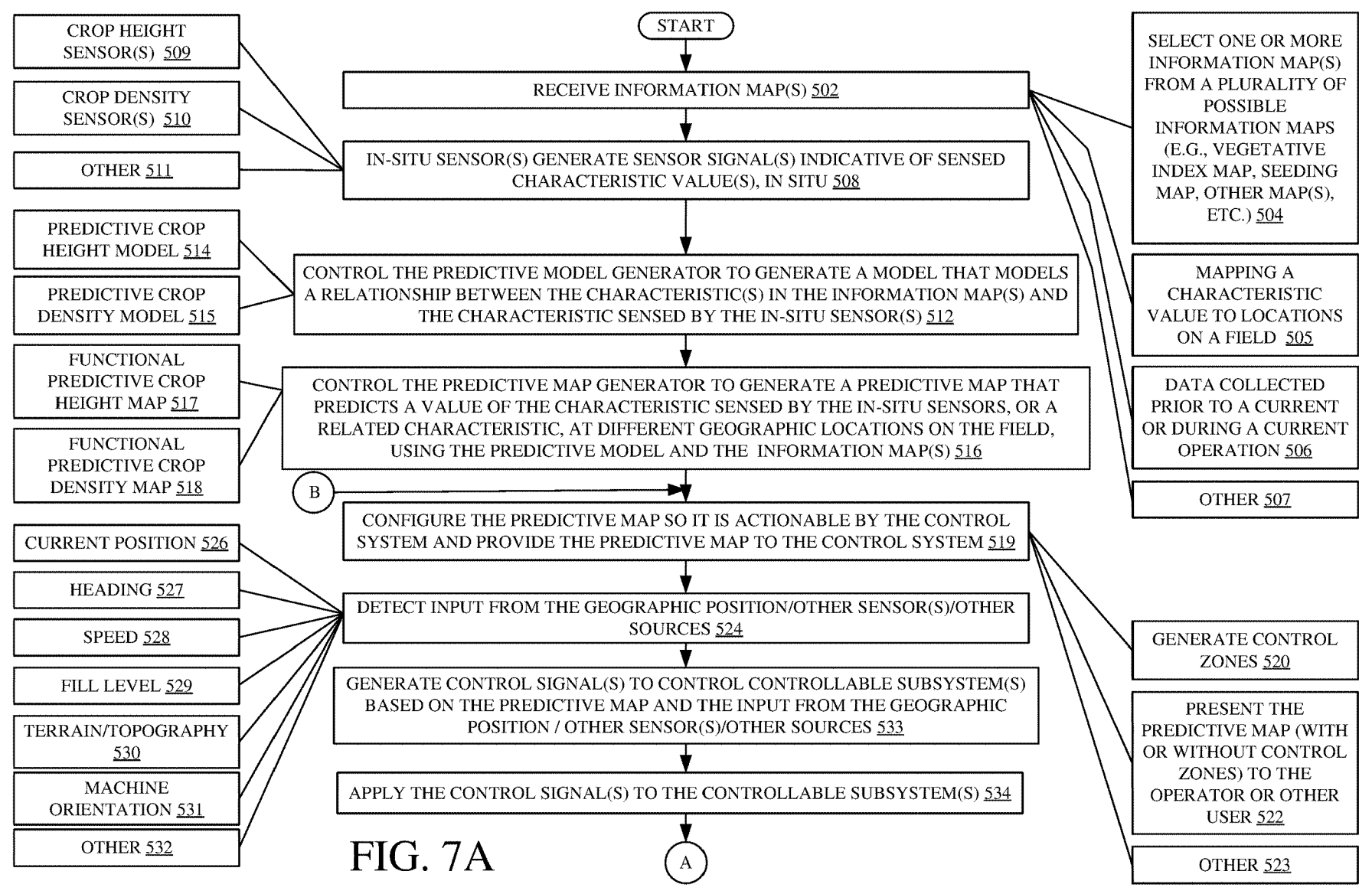
Figure 7B:
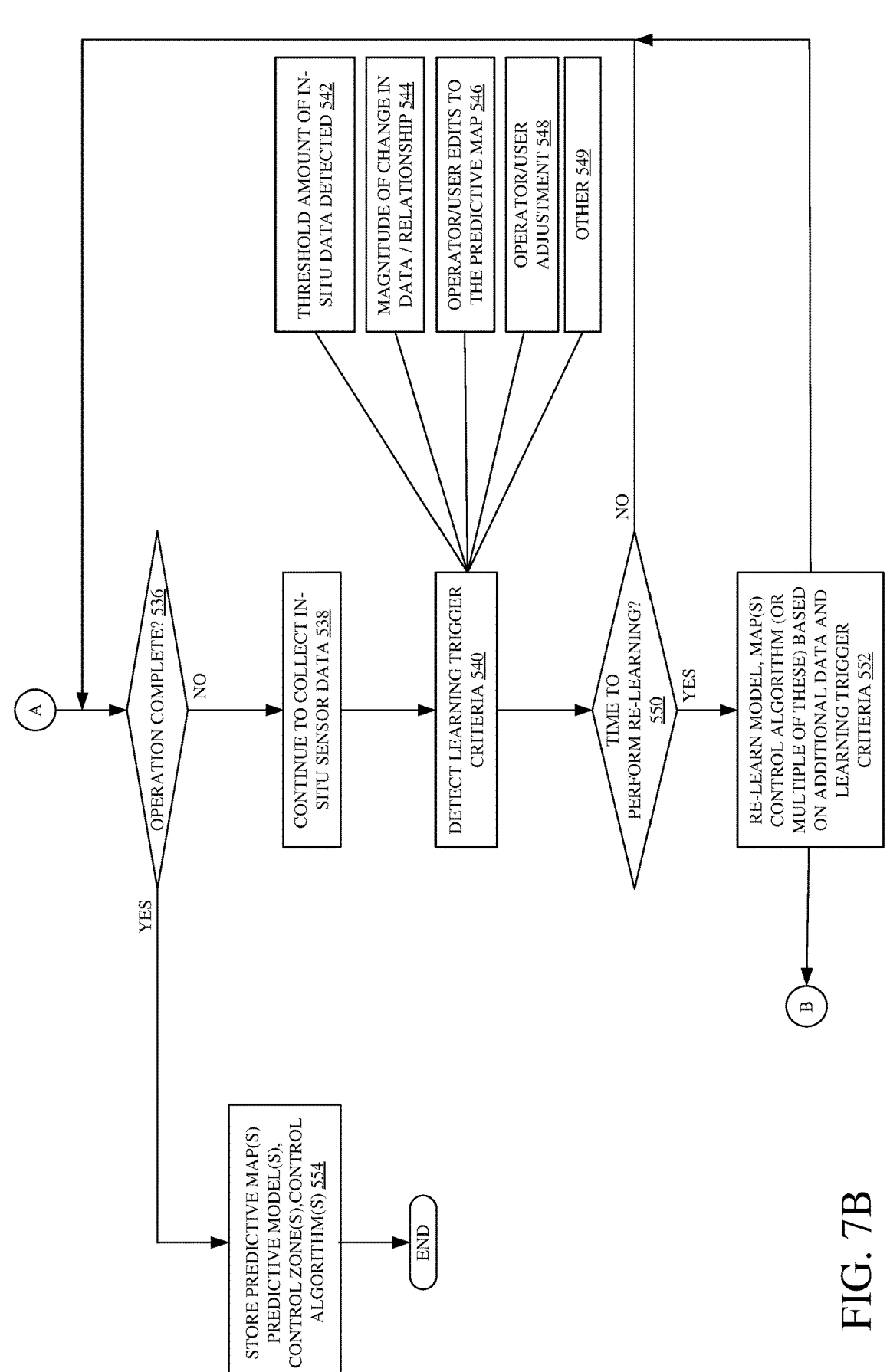

FIGS. 7A-7B (collectively referred to herein as FIG. 7) show a flow diagram illustrating one example of the operation of agricultural spraying system architecture 300 in generating a predictive model and a predictive map.

At block 502, agricultural system 300 receives one or more information maps 358. Examples of information maps 358 or receiving information maps 358 are discussed with respect to blocks 504, 505, 506, and 507. As discussed above, information maps 358 map values of a variable, corresponding to a characteristic, to different locations in the field, as indicated at block 505. As indicated at block 504, receiving the information maps 358 may involve map selector 309, operator 360, or a user 364 selecting one or more of a plurality of possible information maps 358 that are available. For instance, one information map 358 may be a vegetative index map, such as vegetative index map 431. Another information map 358 may be a seeding map, such as seeding map 433. Other types of information maps that map other characteristics (or values thereof) are also contemplated, such as other maps 437. In one example, other maps 437 may be a map that provides crop variety values or crop genotype values, or both, that is not derived in the same way as seeding map 433. Various other types of other maps are contemplated herein. The process by which one or more information maps 358 are selected can be manual, semi-automated, or automated. The information maps 358 can be based on data collected prior to a current operation. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the vegetative index values at the worksite in a prior operation during the same season may be used as data to generate the information maps 358. In other examples, and as described above, the information maps 358 may be predictive maps having predictive values. The predictive information map 358 can be generated by predictive map generator 312 based on a model generated by predictive model generator 310. The data for the information maps 358 can be obtained by agricultural system 300 using communication system 306 and stored in data store 302. The data for the information maps 358 can be obtained by agricultural system 300 using communication system 306 in other ways as well, and this is indicated by block 507 in the flow diagram of FIG. 7.

At block 508, as mobile machine 100 is operating, in-situ sensors 308 generate sensor data indicative of one or more in-situ data values indicative of a characteristic, such as crop characteristic sensors 380 generating sensor data indicative of one or more in-situ data values indicative of a crop characteristic. For example, crop height sensors 382 generate sensor data indicative of one or more in-situ data values indicative of crop height, as indicated by block 509. In another example, crop density sensors 384 generate sensor data indicative of one or more in-situ data values indicative of crop density, as indicated by block 510. In some examples, data from in-situ sensors 308 is georeferenced using position, heading, or speed data from geographic position sensor 304 and in some cases also using dimensions of mobile machine 100, such as when deriving the geographic location of characteristic values detected by in-situ sensors 308 spaced apart from the geographic position sensor 304.

In one example, at block 512, predictive model generator 310 controls one or more of the vegetative index-to-crop height model generator 441, seeding characteristic-to-crop height model generator 442, and other mapped characteristic-to-crop height model generator 443, to generate a model that models the relationship between the mapped values, such as the vegetative index values, the seeding characteristic values, and other mapped characteristic values contained in the respective information map and the in-situ values sensed by the in-situ sensors 308. Predictive model generator 310 generates a predictive crop height model 450 as indicated by block 515.

In another example, at block 512, predictive model generator 310 controls one or more of the vegetative index-to-crop density model generator 1441, seeding characteristic-to-crop density model generator 1442, and other mapped characteristic-to-crop density model generator 1443, to generate a model that models the relationship between the mapped values, such as the vegetative index values, the seeding characteristic values, and other mapped characteristic values contained in the respective information map and the in-situ values sensed by the in-situ sensors 308. Predictive model generator 310 generates a predictive crop density model 1450 as indicated by block 515.

At block, 516, the relationship(s) or model(s) generated by predictive model generator 310 are provided to predictive map generator 312. In one example, at block 516, predictive map generator 312 controls predictive crop height map generator 452 to generate a functional predictive crop height map 460 that predicts crop height (or sensor value(s) indicative of crop height) at different geographic locations in a worksite at which mobile machine 100 is operating using the predictive crop height model 450 and one or more of the information maps, such as vegetative index map 431, seeding map 433, and other maps 437 as indicated by block 517.

It should be noted that, in some examples, the functional predictive crop height map may include two or more different map layers. Each map layer may represent a different data type, for instance, a functional predictive crop height map 460 that provides two or more of a map layer that provides predictive crop height based on vegetative index values from vegetative index map 431, a map layer that provides predictive crop height based on seeding characteristic values from seeding map 433, and a map layer that provides predictive crop height based on other mapped characteristics values from other maps 437. In other examples, functional predictive crop height map 460 may include a layer that provides predictive crop height based on one or more of vegetative index values from vegetative index map 431, seeding characteristic values from seeding map 433, and other mapped characteristic values from other maps 437. Various other combinations are also contemplated.

In another example, at block 516, predictive map generator 312 controls predictive crop density map generator 1452 to generate a functional predictive crop density map 1460 that predicts crop density (or sensor value(s) indicative of crop density) at different geographic locations in a worksite at which mobile machine 100 is operating using the predictive crop density model 1450 and one or more of the information maps, such as vegetative index map 431, seeding map 433, and other maps 437 as indicated by block 518.

It should be noted that, in some examples, the functional predictive crop density map 1460 may include two or more different map layers. Each map layer may represent a different data type, for instance, a functional predictive crop density map 1460 that provides two or more of a map layer that provides predictive crop density based on vegetative index values from vegetative index map 431, a map layer that provides predictive crop density based on seeding characteristic values from seeding map 433, and a map layer that provides predictive crop density based on other mapped characteristics values from other maps 437. In other examples, functional predictive crop density map 1460 may include a layer that provides predictive crop density based on one or more of vegetative index values from vegetative index map 431, seeding characteristic values from seeding map 433, and other mapped characteristic values from other maps 437. Various other combinations are also contemplated.

Additionally, it should be noted that predictive map generator 312 can generate a functional predictive crop characteristic map 458 that provides both predictive crop height and predictive crop density. That is, the predictive crop height values and predictive crop density values can be combined into a single predictive crop characteristic map or, the functional predictive crop height map 460 and the functional predictive crop density map 1460 can be layers of the functional predictive crop characteristic map 458.

At block 519, predictive map generator 312 configures the functional predictive crop height map 460 or the functional predictive crop density map 1460, or both, so that the functional predictive crop height map 460 or the functional predictive crop density map 1460, or both, are actionable (or consumable) by control system 314. Predictive map generator 312 can provide the functional predictive crop height map 460 or the functional predictive crop density map 1460, or both, to the control system 314 or to control zone generator 313, or both. Some examples of the different ways in which the functional predictive crop height map 460 or the functional predictive crop density map 1460, or both, can be configured or output are described with respect to blocks 519, 520, 522, and 523. For instance, predictive map generator 312 configures functional predictive crop height map 460 or functional predictive crop density map 1460, or both, so that functional predictive crop height map 460 or functional predictive crop density map 1460, or both, include values that can be read by control system 314 and used as the basis for generating control signals for one or more of the different controllable subsystems 316 of mobile machine 100, as indicated by block 519.

At block 520, control zone generator 313 can divide the functional predictive crop height map 460 into control zones based on the values on the functional predictive crop height map 460 to generate functional predictive crop height control zone map 461. Alternatively, or additionally, at block 520, control zone generator 313 can divide the functional predictive crop density map 1460 into control zones based on the values on the functional predictive crop density map 1460 to generate functional predictive crop density control zone map 1461. Contiguously-geolocated values that are within a threshold value of one another can be grouped into a control zone. The threshold value can be a default threshold value, or the threshold value can be set based on an operator or user input, based on an input from an automated system, or based on other criteria. A size of the zones may be based on a responsiveness of the control system 314, the controllable subsystems 316, based on wear considerations, or on other criteria.

At block 522, predictive map generator 312 configures functional predictive crop height map 460 or functional predictive crop density map 1460, or both, for presentation to an operator or other user. At block 522, control zone generator 313 can configure functional predictive crop height control zone map 461 or functional predictive crop density control zone map 1461, or both, for presentation to an operator or other user.

When presented to an operator or other user, the presentation of the functional predictive crop height map 460 or of the functional predictive crop height control zone map 461, or both, may contain one or more of the predictive values on the functional predictive crop height map 460 correlated to geographic location, the control zones of functional predictive crop height control zone map 461 correlated to geographic location, and settings values or control parameters that are used based on the predicted values on predictive map 460 or control zones on predictive control zone map 461. The presentation can, in another example, include more abstracted information or more detailed information. The presentation can also include a confidence level that indicates an accuracy with which the predictive values on predictive map 460 or the control zones on predictive control zone map 461 conform to measured values that may be measured by sensors on mobile machine 100 as mobile machine 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the predictive map 460 or predictive control zone map 461, or both, or make any changes to machine operation. A supervisor, such as a supervisor at a remote location, however, may be able to see the predictive map 460 or predictive control zone map 461, or both, on the display but be prevented from making any changes. A manager, who may be at a separate remote location, may be able to see all of the elements on predictive map 460 or predictive control zone map 461, or both, and also be able to change the predictive map 460 or predictive control zone map 461, or both. In some instances, the predictive map 460 or predictive control zone map 461, or both, accessible and changeable by a manager located remotely, may be used in machine control. This is one example of an authorization hierarchy that may be implemented.

The predictive map 460 or predictive control zone map 461, or both, can be configured in other ways as well, as indicated by block 523.

When presented to an operator or other user, the presentation of the functional predictive crop density map 1460 or of the functional predictive crop density control zone map 1461, or both, may contain one or more of the predictive values on the functional predictive crop density map 1460 correlated to geographic location, the control zones of functional predictive crop density control zone map 1461 correlated to geographic location, and settings values or control parameters that are used based on the predicted values on predictive map 1460 or control zones on predictive control zone map 1461. The presentation can, in another example, include more abstracted information or more detailed information. The presentation can also include a confidence level that indicates an accuracy with which the predictive values on predictive map or the control zones on predictive control zone map 1461 conform to measured values that may be measured by sensors on mobile machine 100 as mobile machine 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the predictive map 1460 or predictive control zone map 1461, or both, or make any changes to machine operation. A supervisor, such as a supervisor at a remote location, however, may be able to see the predictive map 1460 or predictive control zone map 1461, or both, on the display but be prevented from making any changes. A manager, who may be at a separate remote location, may be able to see all of the elements on predictive map 1460 or predictive control zone map 1461, or both, and also be able to change the predictive map 1460 or predictive control zone map 1461, or both. In some instances, the predictive map 1460 or predictive control zone map 1461, or both, accessible and changeable by a manager located remotely, may be used in machine control. This is one example of an authorization hierarchy that may be implemented.

The predictive map 1460 or predictive control zone map 1461, or both, can be configured in other ways as well, as indicated by block 523.

At block 524, input from geographic position sensor 304 and other in-situ sensors 308 are received by the control system 314. Particularly, at block 526, control system 314 detects an input from the geographic position sensor 304 identifying a geographic location of mobile machine 100. The geographic location of mobile machine 100 can be used, along with machine dimensions, to derive a geographic location of a component of mobile machine 100, such as a geographic location of a particular nozzle or multi-nozzle assembly, the boom, the boom arms, and boom sections by subsequent processing of the input from geographic position sensor 304. Block 527 represents receipt by the control system 314 of sensor inputs indicative of trajectory or heading of mobile machine 100, and block 528 represents receipt by the control system 314 of a speed of mobile machine 100. Block 529 represents receipt by the control system 314 of a fill level of the one or more product tanks or reservoirs of mobile machine 100. Block 530 represents receipt by the control system 314 of a terrain profile or topography of the worksite. Block 531 represent receipt by the control system 314 of machine orientation characteristics (e.g., pitch, roll, and/or yaw). Block 532 represents receipt by the control system 314 of other information from various in-situ sensors 308 or other sources (e.g., maps of the worksite, such as a topographic map).

In one example, at block 533 control system 314 generates control signals to control the controllable subsystems 316 based on the functional predictive crop height map 460 or the functional predictive crop height control zone map 461, or both, and one or more of the input from the geographic position sensor 304 (or the derived geographic location of one or more particular components of the mobile machine 100), the heading of the mobile machine 100 as provided by heading/speed sensors 325, the speed of the mobile machine as provided by heading/speed sensors 325, the fill level of the one or more tanks or reservoirs of the mobile machine 100 as provided by fill level sensors 323, the terrain or topography of the worksite as provided by terrain sensors 322 (or other sources, such as a topographic map of the worksite), the orientation characteristics of mobile machine 100 as provided by machine orientation sensors 326, as well as a variety of other information, such as height of mobile machine 100 as provided by machine height sensors 327 and height of a boom, boom arms, or boom sections, as provided by boom height sensors 324. At block 534, control system 314 applies the control signals to the controllable subsystems 316. It will be appreciated that the particular control signals that are generated, and the particular controllable subsystems 316 that are controlled, may vary based upon one or more different things. For example, the control signals that are generated and the controllable subsystems 316 that are controlled may be based on the type of functional predictive crop height map 460 or functional predictive crop height control zone map 461 or both that is being used. Similarly, the control signals that are generated and the controllable subsystems 316 that are controlled, and the timing of the control signals can be based on various latencies of mobile machine 100 and the responsiveness of the controllable subsystems 316.

By way of example, at blocks 533 and 534, propulsion controller 331 can generate and apply control signals to control propulsion subsystem 350 to vary a speed setting, such as a travel speed, acceleration, or deceleration, of mobile machine 100. For example, it may be that for areas of the worksite with predictive crop heights at or below a given threshold or below the height setting of the boom, the speed may be increased, as there is less risk of contact between the boom and the crops. In determining if the speed is to be increased, the other information obtained at block 524 such as position, heading, speed, fill level, terrain/topography, machine orientation, machine height, boom height, etc. In another example, it may be that for areas of the worksite with predictive crop height that are at or exceed a threshold or are at or above the height setting of the boom, the speed may be decreased, to reduce the impact from the boom contacting the crops.

By way of another example, at blocks 533 and 534, machine height controller 333 can generate and apply control signals to control machine height subsystem 347 to vary a machine height setting (height of the mobile machine 100 or frame of mobile machine 100 above the worksite) of mobile machine 100. For example, the machine height can be increased to avoid contact between the mobile machine 100 (e.g., boom of mobile machine 100) and the crops. In another example, the machine height can be increased or decreased to achieve a desired product application. For instance, the boom may clear the height of the crops, however, the crops may be close enough to affect the distribution of the sprayed product. In another example, the boom may clear the height of the crops, but the crops may be too far from the boom to achieve the desired coverage.

By way of another example, at blocks 533 and 534, boom height controller 334 can generate and apply control signals to control boom height subsystem 349 to vary a height setting of the boom, one or more boom arms, or one or more booms sections of mobile machine 100 to control the height of the boom, one or more boom arms, or one or more boom sections of mobile machine 100 above the worksite. For example, the height of the boom, one or more boom arms, or one or more boom sections, can be increased to avoid contact between the component and the crops. In another example, the height of the boom, one or more boom arms, one or more boom sections, can be increased or decreased to achieve a desired product application. For instance, the boom component may clear the height of the crops, however, the crops may be close enough to affect the distribution of the sprayed product. In another example, the component may clear the height of the crops, but the crops may be too far from the component to achieve a desired coverage.

By way of another example, at blocks 533 and 534, nozzle controller 335 can generate and apply control signals to control nozzle operation subsystem 349 to deactivate one or more spray nozzles (e.g., 208) and activate one or more other spray nozzles (e.g., 208) to control an application of product to the worksite (or crops of the worksite). For example, based on the predictive height of the crops and the height of the nozzle(s) (or nozzle assembly) as indicated by the boom height sensors 324 or a boom height setting, or in other ways, nozzle controller 335 can generate control signals to control nozzle operation 349 to deactivate one or more spray nozzles and activate one or more other spray nozzles to achieve the desired substance application. For instance, it may be, given the height of the crop, the height of the nozzle(s) (or nozzle assembly), and the spray pattern and corresponding dispersal area of the currently active nozzle(s), that the application of product will be deleteriously affected. Thus, the current nozzle(s) may be deactivated, and one or more other nozzle(s) can be activated.

It should be noted that a combination of the controls described above may be implemented. For instance, based on the functional predictive crop height map 460 or the functional predictive crop height control zone map 461, as well as, in some examples, the other information obtained at block 524, a combination of control actions can be implemented. For example, two or more of the speed setting of mobile machine 100, the machine height setting of mobile machine 100, and the height setting of the boom, boom arms, or boom sections can be adjusted as well as the activation and deactivation of nozzle(s). In some examples, the particular combination of controls and/or the extent to which the controls adjust the settings can be based on values from the predictive crop height map 460, the zones from the predictive crop height control zone map 461, and the other information obtained at block 524.

These are merely some examples. Control system 314 can generate a variety of different control signals to control a variety of different controllable subsystems 316 based on functional predictive crop height map 460 or functional predictive crop height control zone map 461, or both. Additionally, it will be understood that the timing of the control signals can be based on the travel speed of the mobile machine 100, the location of the mobile machine 100 or the location of a particular component of the mobile machine 100, as well as various other information obtained at block 524, as well as latencies of the system.

In another example, at block 533, control system 314 generates and applies control signals to control the controllable subsystems 316 based on the functional predictive crop density map 1460 or the functional predictive crop density control zone map 1461, or both, and one or more of the input from the geographic position sensor 304 (or the derived geographic location of one or more particular components of the mobile machine 100), the heading of the mobile machine as provided by heading/speed sensors 325, the speed of the mobile machine as provided by heading/speed sensors 325, the fill level of the one or more tanks or reservoirs of the mobile machine 100 as provided by fill level sensors 323, the terrain or topography of the worksite as provided by terrain sensors 322 (or other sources, such as a topographic map of the worksite), the orientation characteristics of mobile machine 100 as provided by machine orientation sensors 326, as well as a variety of other information, such as height of mobile machine 100 as provided by machine height sensors 327 and height of a boom, boom arms, or boom sections, as provided by boom height sensors 324. At block 534, control system 314 applies the control signals to the controllable subsystems 316. It will be appreciated that the particular control signals that are generated, and the particular controllable subsystems 316 that are controlled, may vary based upon one or more different things. For example, the control signals that are generated and the controllable subsystems 316 that are controlled may be based on the type of functional predictive crop density map 1460 or functional predictive crop density control zone map 1461 or both that is being used. Similarly, the control signals that are generated and the controllable subsystems 316 that are controlled, and the timing of the control signals can be based on various latencies of mobile machine 100 and the responsiveness of the controllable subsystems 316.

By way of example, at blocks 533 and 534, machine height controller 333 can generate and apply control signals to control machine height subsystem 347 to vary a machine height setting (height of the mobile machine 100 or frame of mobile machine 100 above the worksite) of mobile machine 100. For example, the machine height can be increased or decreased to obtain the desired product application. For instance, given the predictive crop density value, and the current height of the spray nozzle(s), the spray pattern and corresponding dispersal area of the nozzle(s) may be such that the product will not be applied desirably. For instance, the product may not be applied to all of the crop in the given area for which the nozzle is responsible, or the product may be applied too widely such that some product is applied needlessly (which can result in waste, drift, and can have deleterious effects on the soil, etc.). Thus, the machine height can be adjusted to achieve the desired application of the product.

By way of example, at blocks 533 and 534, boom height controller 334 can generate and apply control signals to control boom height subsystem 349 to vary a height setting of the boom, one or more boom arms, or one or more booms sections of mobile machine 100 to control the height of the boom, one or more boom arms, or one or more boom sections of mobile machine above the worksite. For example, the height of the boom, one or more boom arms, one or more boom sections, can be increased or decreased to achieve a desired product application. For instance, given the predictive crop density value and the current height of the spray nozzle(s) (as indicated by boom height sensors 224 or a boom height setting, or in other ways), the spray pattern and corresponding dispersal area of the nozzle(s) may be such that the product will not be applied desirably. For instance, the product may not be applied to all of the crop in the given area for which the nozzle is responsible, or the product may be applied too widely such that some product is applied needlessly (which can result in waste, drift, and can have deleterious effects on the soil, etc.). Thus, the height of the boom, boom arms, or boom sections can be adjusted to achieve the desired application of the product.

By way of example, at blocks 533 and 534, nozzle controller 335 can generate control signals to control nozzle operation subsystem 349 to deactivate one or more spray nozzles (e.g., 208) and activate one or more other spray nozzles (e.g., 208) to control an application of product to the worksite (or crops of the worksite). For instance, given the predictive crop density value, and the current height of the spray nozzle(s), the spray pattern and corresponding dispersal area of the nozzle(s) may be such that the product will not be applied desirably. For instance, the product may not be applied to all of the crop in the given area for which the nozzle is responsible, or the product may be applied to widely such that some product is applied needlessly (which can result in waste, drift, and can have deleterious effects on the soil, etc.). Thus, the currently active nozzle(s) can be deactivated, and one or more other nozzles can be activated to achieve the desired application of the product.

It should be noted that a combination of the controls described above may be implemented. For instance, based on the functional predictive crop density map 1460 or the functional predictive crop density control zone map 1461, as well as, in some examples, the other information obtained at block 524, a combination of control actions can be implemented. For example, two or more of the, the machine height setting of mobile machine 100, the height setting of the boom, boom arms, or boom sections can be adjusted as well as the activation and deactivation of nozzles. In some examples, the particular combination of controls and/or the extent to which the controls adjust the settings can be based on values from the predictive crop density map 1460, the zones from the predictive crop density control zone map 1460, and the other information obtained at block 524.

These are merely some examples. Control system 314 can generate a variety of different control signals to control a variety of different controllable subsystems 316 based on functional predictive crop density map 1460 or functional predictive crop density control zone map 1461, or both. Additionally, it will be understood that the timing of the control signals can be based on the travel speed of the mobile machine 100, the location of the mobile machine 100 or the location of a particular component of the mobile machine 100, as well as various other information obtained at block 524, as well as latencies of the system.

At block 536, a determination is made as to whether the operation has been completed. If the operation is not completed, the processing advances to block 538 where in-situ sensor data from geographic position sensor 304, heading/speed sensors 325, and other in-situ sensors 308 (and perhaps other sensors) continue to be read.

In some examples, at block 540, agricultural system 300 can also detect learning trigger criteria to perform machine learning on one or more of the functional predictive crop height map 460, the functional predictive crop height control zone map 461, the predictive crop height model 450, the functional predictive crop density map 1460, the functional predictive crop density control zone map 1461, the predictive crop density model 1450, the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 542, 544, 546, 548, and 549. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold trigger or causes the predictive model generator 310 to generate a new predictive model that is used by predictive map generator 312. Thus, as mobile machine 100 continues an operation, receipt of the threshold amount of in-situ sensor data from the in-situ sensors 308 triggers the creation of a new relationship represented by a new predictive crop height model 450 or a new predictive crop density model 1450, or both, generated by predictive model generator 310. Further, a new functional predictive crop height map 460, a new functional predictive crop height control zone map 461, or both, can be generated using the new predictive crop height model 450. Further, a new functional predictive crop density map 1460, a new functional predictive crop density control zone map 1461, or both, can be generated using the new predictive crop density model 1450. Block 542 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive crop characteristic map 458, a new functional predictive crop characteristic control zone map 459, or both. However, if variations within the in-situ sensor data are outside of the selected range, are greater than the defined amount, or are above the threshold value, for example, then the predictive model generator 310 generates a new predictive crop characteristic model 449 (e.g., 450 or 1450, or both) using all or a portion of the newly received in-situ sensor data that the predictive map generator 312 uses to generate a new predictive crop characteristic map 458 (e.g., 460 or 1460, or both) which can be provided to control zone generator 313 for the creation of a new predictive crop characteristic control zone map 459 (e.g., 461 or 1461, or both). At block 544, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive model, a new predictive map, and a new predictive control zone map. Keeping with the examples described above, the threshold, the range, and the defined amount can be set to default values; set by an operator or user interaction through an interface mechanism; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of mobile machine 100 to a different area of the field or to a different control zone may be used as learning trigger criteria as well.

In some instances, operator 360 or a user 366 can also edit the functional predictive crop characteristic map 458 (e.g., 460 or 1460, or both) or functional predictive crop characteristic control zone map 459 (e.g., 461 or 1461, or both), or both. The edits can change a value on the functional predictive crop characteristic map 458 (e.g., 460 or 1460, or both), change a size, shape, position, or existence of a control zone on functional predictive crop characteristic control zone map 459 (e.g., 460 or 1460), or both. Block 546 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 desires the controllable subsystem 316 to operate in a different way than is being commanded by control system 314. Thus, manual alteration of a setting by the operator 360 or user 366 can cause one or more of predictive model generator 310 to relearn predictive crop characteristic model 449 (e.g., 450 or 1450, or both), predictive map generator 312 to generate a new functional predictive crop characteristic map 458 (e.g., 460 or 1460, or both), control zone generator 313 to generate one or more new control zones on functional predictive crop characteristic control zone map 459 (e.g., 461 or 1461, or both), and control system 314 to relearn a control algorithm or to perform machine learning on one or more of the controller components 329 through 337 in control system 314 based upon the adjustment by the operator 360 or user 366, as shown in block 548. Block 549 represents the use of other triggered learning criteria.

In other examples, relearning may be performed periodically or intermittently based, for example, upon a selected time interval such as a discrete time interval or a variable time interval, as indicated by block 550.

If relearning is triggered, whether based upon learning trigger criteria or based upon passage of a time interval, as indicated by block 550, then one or more of the predictive model generator 310, predictive map generator 312, control zone generator 313, and control system 314 performs machine learning to generate new predictive model(s), new predictive map(s), new control zone(s), and new control algorithm(s), respectively, based upon the learning trigger criteria or based upon the passage of a time interval. The new predictive model(s), the new predictive map(s), the new control zone(s), and the new control algorithm(s) are generated using any additional data that has been collected since the last learning operation was performed. Performing relearning is indicated by block 552.

If the operation has not been completed, operation moves from block 552 to block 518 such that the new predictive model(s), the new predictive map(s), the new control zone(s), and/or the new predictive control algorithm(s) can be used to control mobile machine 100. If the operation has been completed, operation moves from block 552 to block 554 where one or more of the functional predictive crop height map 460, functional predictive crop height control zone map 461, the predictive crop height model 450, the functional predictive crop density map 1460, the functional predictive crop density control zone map 1461, the predictive crop density model 1450, control zone(s), and control algorithm(s), are stored. The functional predictive map(s), functional predictive control zone map(s), predictive model(s), the control zone(s), and the control algorithm(s) may be stored locally on data store 302 or sent to a remote system using communication system 306 for later use.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or at the same worksite at a different time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value varies from a predictive value of the characteristic such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation crossed the threshold are used to generate a linear equation. The linear equation is used to adjust the predictive characteristic value in areas of the worksite not yet operated at during the current operation (e.g., unsprayed areas during the current spraying operation) in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a vegetative index map, a seeding map, and another type of map.

In-situ sensors generate sensor data indicative of in-situ characteristic values, such as in-situ crop characteristic values (e.g., crop height values or crop density values, or both).

A predictive model generator generates one or more predictive models based on the one or more obtained maps and the in-situ sensor data, such as a predictive crop characteristic model (e.g., a predictive crop height model or a predictive crop density model, or both).

A predictive map generator generates one or more functional predictive maps based on a model generated by the predictive model generator and the one or more obtained maps. For example, the predictive map generator may generate a functional predictive crop characteristic map that maps predictive crop characteristic values to one or more locations on the worksite based on a predictive crop characteristic model and the one or more obtained maps. For example, the predictive map generator may generate one or more of a functional predictive crop height map that maps predictive crop height values to one or more locations on the worksite based on a predictive crop height model and the one or more obtained maps and a functional predictive crop density map that maps predictive crop density values to one or more locations on the worksite based on a predictive crop density model and the one or more obtained maps.

Control zones, which include machine settings values, can be incorporated into the functional predictive crop characteristic map to generate a functional predictive crop characteristic control zone map. For example, control zones can be incorporated into one or more of a functional predictive crop height map to generate a functional predictive crop height control zone map and into a predictive crop density map to generate a functional predictive crop density control zone map.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic and interactions. It will be appreciated that any or all of such systems, components, logic and interactions may be implemented by hardware items, such as processors, memory, or other processing components, some of which are described below, that perform the functions associated with those systems, components, or logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 8:
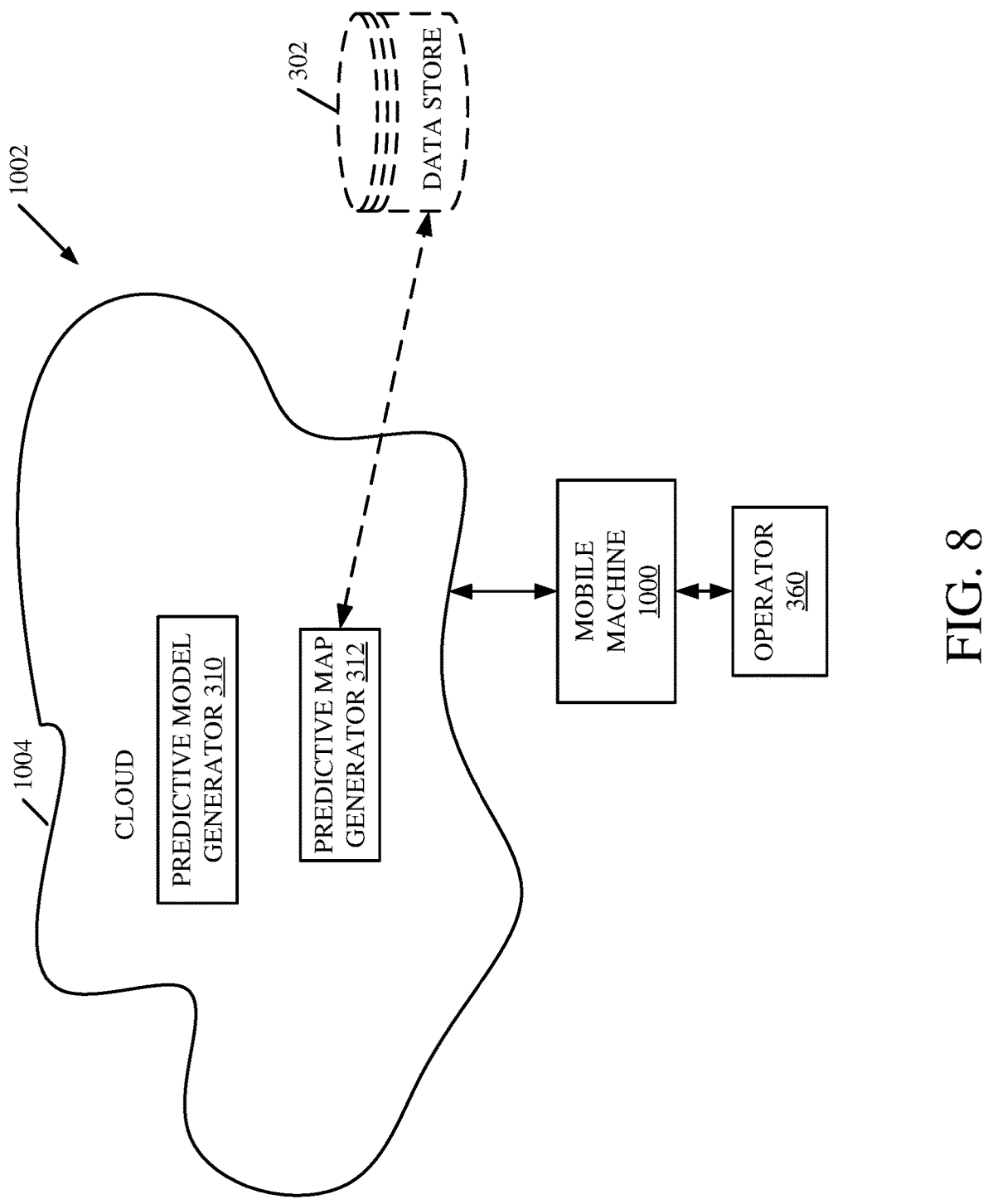
FIG. 8 is a block diagram showing one example of a mobile machine in communication with a remote server environment.

FIG. 8 is a block diagram of mobile machine 1000, which may be similar to mobile machine 100 shown in FIG. 4. The mobile machine 100 communicates with elements in a remote server architecture 1002. In some examples, remote server architecture 1002 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 4 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 8, some items are similar to those shown in FIG. 4 and those items are similarly numbered. FIG. 8 specifically shows that predictive model generator 310 or predictive map generator 312, or both, may be located at a server location 1004 that is remote from the mobile machine 1000. Therefore, in the example shown in FIG. 8, mobile machine 1000 accesses systems through remote server location 1004. In other examples, various other items may also be located at server location 1004, such as data store 302, map selector 309, predictive model 311, functional predictive maps 263 (including predictive maps 264 and predictive control zone maps 265), control zone generator 313, control system 314, and processing system 338.

FIG. 8 also depicts another example of a remote server architecture. FIG. 8 shows that some elements of FIG. 8 may be disposed at a remote server location 1004 while others may be located elsewhere. By way of example, data store 302 may be disposed at a location separate from location 1004 and accessed via the remote server at location 1004. Regardless of where the elements are located, the elements can be accessed directly by mobile machine 1000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the mobile machine 1000 comes close to the machine containing the information collection system, such as a fuel truck prior to fueling, the information collection system collects the information from the mobile machine 1000 using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on the mobile machine 1000 until the mobile machine 1000 enters an area having wireless communication coverage. The mobile machine 1000, itself, may send the information to another network.

It will also be noted that the elements of FIG. 4, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1002 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 9:
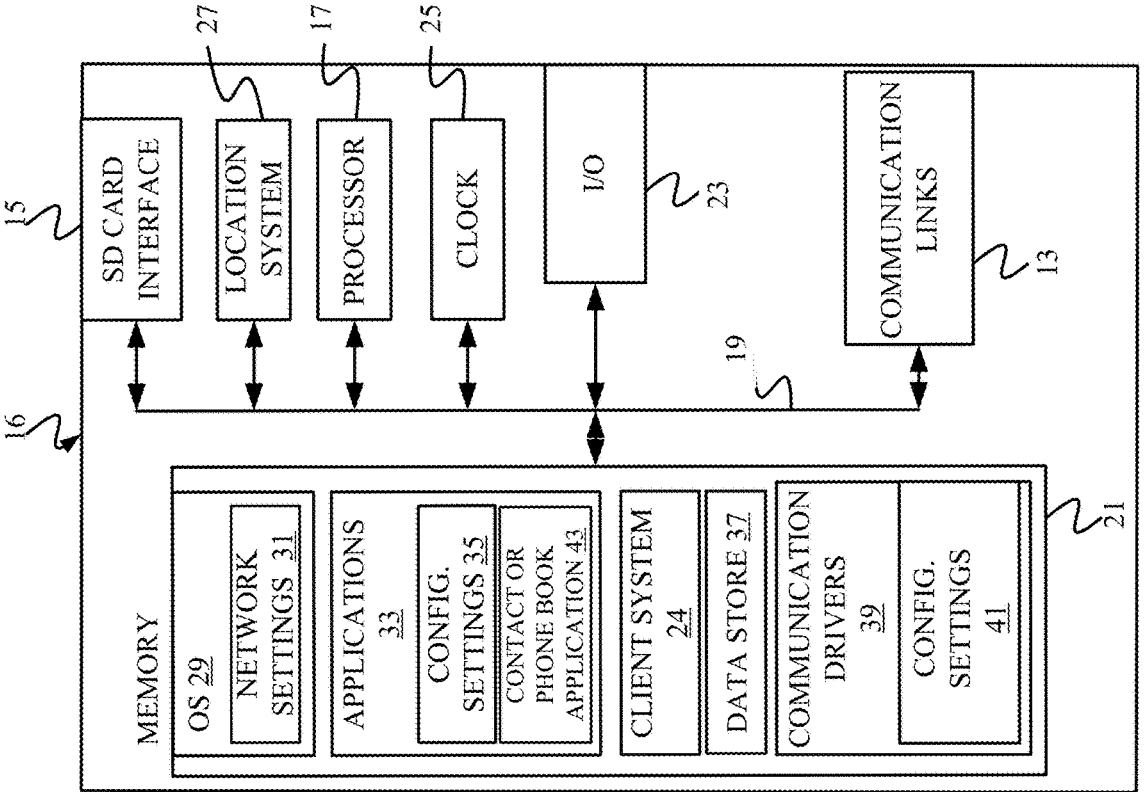
FIGS. 9-11 show examples of mobile devices that can be used in an agricultural spraying system.
Figure 10:
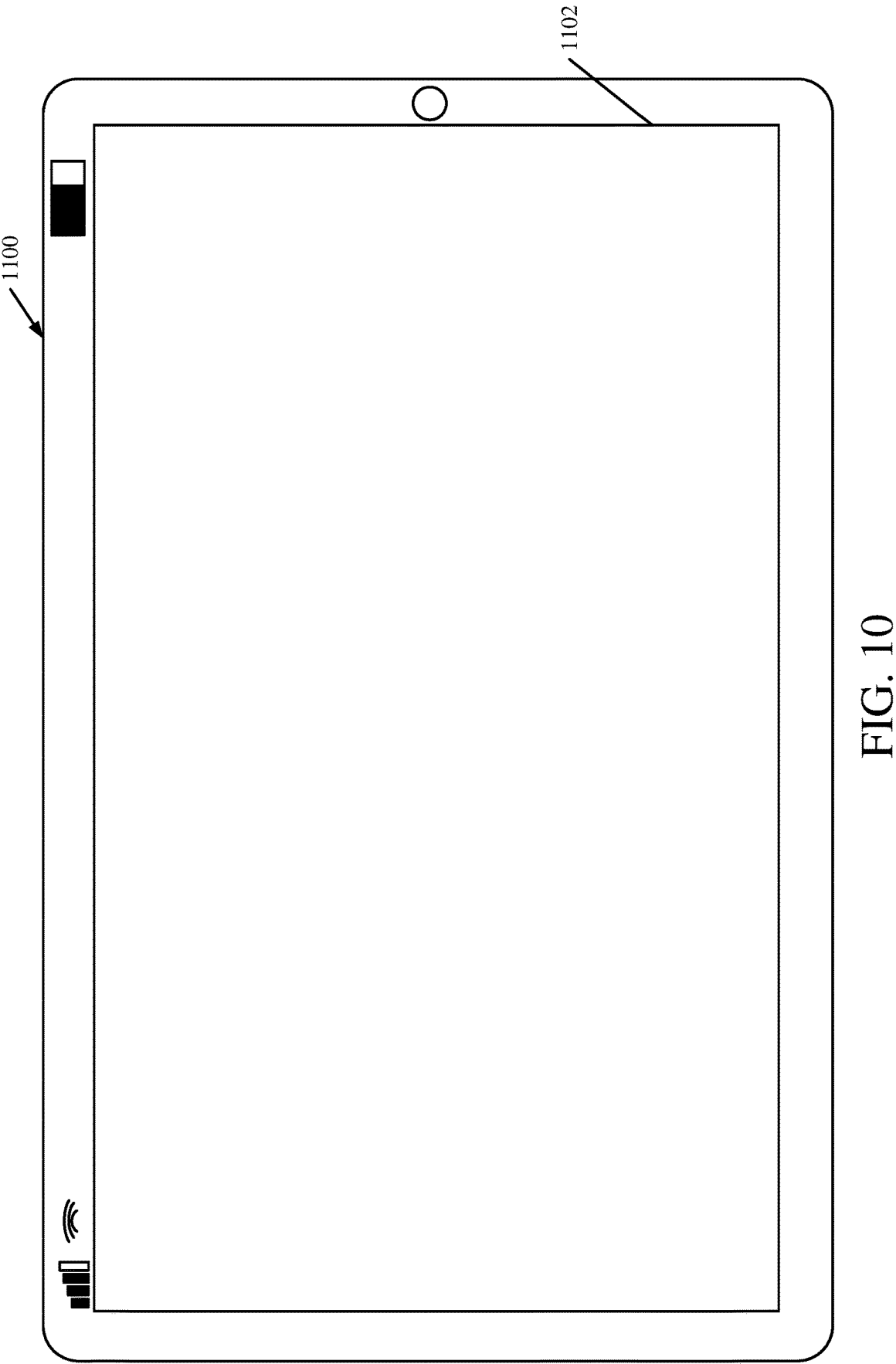
Figure 11:
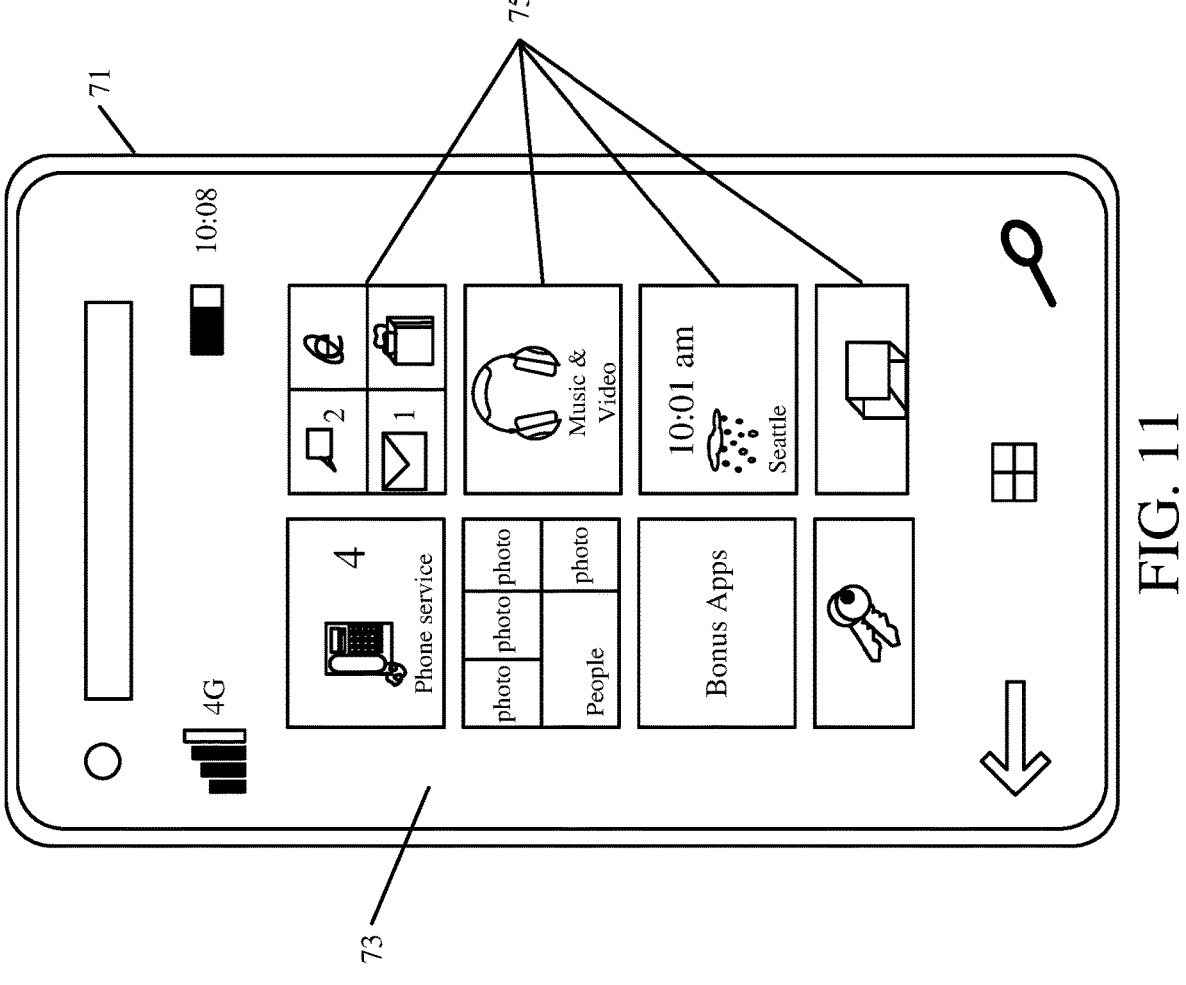

FIG. 9 is a simplified block diagram of one illustrative example of a handheld or mobile computing device that can be used as a user's or client's handheld device 16, in which the present system (or parts of it) can be deployed. For instance, a mobile device can be deployed in the operator compartment of mobile machine 100 for use in generating, processing, or displaying the maps discussed above. FIGS. 10-11 are examples of handheld or mobile devices.

FIG. 9 provides a general block diagram of the components of a client device 16 that can run some components shown in FIG. 4, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. UO components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 10 shows one example in which device 16 is a tablet computer 1100. In FIG. 10, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 11 is similar to FIG. 10 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
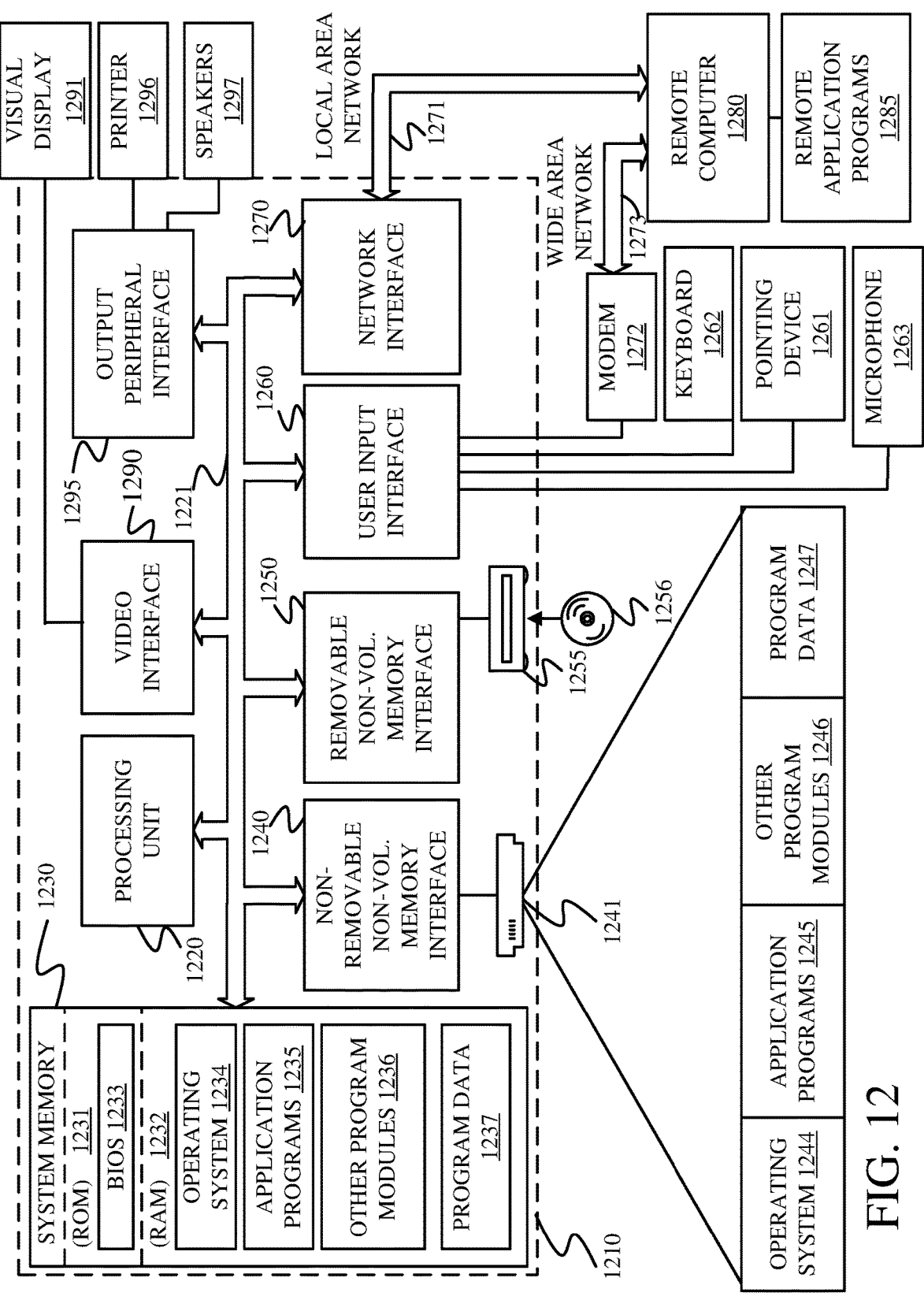
FIG. 12 is a block diagram showing one example of a computing environment that can be used in an agricultural spraying system.

FIG. 12 is one example of a computing environment in which elements of FIG. 4 can be deployed. With reference to FIG. 12, an example system for implementing some embodiments includes a computing device in the form of a computer 1210 programmed to operate as discussed above. Components of computer 1210 may include, but are not limited to, a processing unit 1220 (which can comprise processors or servers from previous FIGS.), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to FIG. 4 can be deployed in corresponding portions of FIG. 12.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable volatile/nonvolatile computer storage media. By way of example only, FIG. 12 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FP-GAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 12 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for generating functional predictive maps and controlling a machine based on functional predictive maps have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for generating functional predictive maps and controlling a machine based on functional predictive maps. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited.

Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

The ranges disclosed herein also encompass any and all overlap, subranges, and combinations thereof. Language such as "up to," "at least," "greater than," "less than,"

"between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

In summary, various embodiments and examples of systems and methods for generating functional predictive maps and controlling a machine based on functional predictive maps, have been disclosed. Although the systems and methods for generating functional predictive maps and controlling a machine based on functional predictive maps have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

What is claimed is:

1. An agricultural spraying system comprising:
a communication system configured to receive an information map that includes values of a characteristic corresponding to different geographic locations in a worksite;
an in-situ crop characteristic sensor configured to detect a value of a crop characteristic corresponding to a geographic location in the worksite;
one or more processors; and
a data store configured to store computer executable instructions that, when executed by the one or more processors, are configured to configure the one or more processors to:
generate a predictive model indicative of a relationship between values of the characteristic and values of the crop characteristic based on a value of the characteristic in the information map at the geographic location and the value of the crop characteristic detected by the in-situ sensor corresponding to the geographic location;
generate a functional predictive map of the worksite that maps predictive values of the crop characteristic to the different geographic locations in the worksite, based on the values of the characteristic in the information map and based on the predictive model; and
generate, based on the functional predictive map, control signals to control one or more of:
a propulsion subsystem of the mobile agricultural sprayer;
a machine height subsystem of the mobile agricultural sprayer; and
a boom height subsystem of the mobile agricultural sprayer.

2. The agricultural spraying system of claim 1, wherein the predictive map generator is configured to prepare the functional predictive map for consumption by a control system that generates control signals to control a controllable subsystem on a mobile agricultural sprayer based on the functional predictive map.

3. The agricultural spraying system of claim 1, wherein the in-situ crop characteristic sensor is an in-situ crop height sensor configured to detect a value of crop height corresponding to the geographic location in the worksite.

4. The agricultural spraying system of claim 3, wherein the information map comprises a vegetative index map that maps, as the values of the characteristic, vegetative index values to the different geographic locations in the worksite, and wherein the predictive model comprises a predictive crop height model indicative of a relationship between vegetative index values and values of crop height based on the value of crop height detected by the in-situ crop height sensor corresponding to the geographic location and the vegetative index value, in the vegetative index map, at the geographic location, the predictive crop height model being configured to receive a vegetative index value as a model input and generate a value of crop height as a model output based on the relationship.

5. The agricultural spraying system of claim 3, wherein the information map comprises a seeding map that maps, as the values of the characteristic, seeding characteristic values to the different geographic locations in the worksite, and wherein the predictive model comprises a predictive crop height model indicative of a relationship between seeding characteristic values and values of crop height based on the value of crop height detected by the in-situ crop height sensor corresponding to the geographic location and the seeding characteristic value, in the seeding map, at the geographic location, the predictive crop height model being configured to receive a seeding characteristic value as a model input and generate a value of crop height as a model output based on the relationship.

6. The agricultural spraying system of claim 1, wherein the in-situ crop characteristic sensor is an in-situ crop density sensor configured to detect a value of crop density corresponding to the geographic location in the worksite.

7. The agricultural spraying system of claim 6, wherein the information map comprises a vegetative index map that maps, as the values of the characteristic, vegetative index values to the different geographic locations in the worksite, and wherein the predictive model generator comprises a predictive crop density model indicative of a relationship between vegetative index values and values of crop density based on the value of crop density detected by the in-situ crop density sensor corresponding to the geographic location and the vegetative index value, in the vegetative index map, at the geographic location, the predictive crop density model being configured to receive a vegetative index value as a model input and generate a value of crop density as a model output based on the relationship.

8. The agricultural spraying system of claim 6, wherein the information map comprises a seeding map that maps, as the values of the characteristic, seeding characteristic values to the different geographic locations in the worksite, and wherein the predictive model comprises a predictive crop density model indicative of a relationship between seeding characteristic values and values of crop density based on the value of crop density detected by the in-situ crop density sensor corresponding to the geographic location and the seeding characteristic value, in the seeding map, at the geographic location, the predictive crop density model being configured to receive a seeding characteristic value as a model input and generate a value of crop density as a model output based on the relationship.

9. The agricultural spraying system of claim 1, wherein the computer executable instructions, when executed by the one or more processors, are further configured to configure the one or more processors to generate, based on the functional predictive map, control signals to control:

a nozzle operation subsystem, of the mobile agricultural sprayer, to deactivate a first nozzle and activate a second nozzle.

10. The agricultural spraying system of claim 1, wherein the information map comprises two or more information maps, each of the two or more information maps including values of a respective characteristic corresponding to different geographic locations in the worksite;

wherein the predictive model comprises a predictive crop characteristic model indicative of a relationship between values of the two or more respective characteristics and the values of the crop characteristic based on the value of the crop characteristic detected by the in-situ sensor corresponding to the geographic location and a value of each of the two or more respective characteristics in the respective information map corresponding to the geographic location; and wherein the functional predictive map comprises a functional predictive crop characteristic map that maps predictive values of the crop characteristic to the different geographic locations in the worksite, based on the values of the two or more respective characteristics in the two or more information maps and based on the predictive crop characteristic model.

11. A computer implemented method of controlling a mobile agricultural sprayer comprising:

receiving an information map that maps values of a characteristic to different geographic locations in a worksite;

detecting, with an in-situ sensor, a value of a crop characteristic corresponding to a geographic location at the worksite while a mobile agricultural sprayer is operating at the worksite;

generating a predictive model indicative of a relationship between values of the characteristic and values of the crop characteristic based on the value of the crop characteristic detected by the in-situ sensor corresponding to the geographic location and the value of the characteristic in the information map at the geographic location;

controlling a predictive map generator to generate the functional predictive map of the worksite that maps predictive values of the crop characteristic to the different locations in the worksite based on the values of the characteristic in the information map and the predictive model; and generating, based on the functional predictive map, control signals to control one or more of:

a propulsion subsystem of the mobile agricultural sprayer;

a machine height subsystem of the mobile agricultural sprayer; and a boom height subsystem of the mobile agricultural sprayer.

12. The computer implemented method of claim 11, wherein detecting, with an in-situ sensor, the value of the crop characteristic corresponding to the geographic location comprises detecting, with an in-situ crop height sensor, a value of crop height corresponding to the geographic location.

13. The computer implemented method of claim 12, wherein receiving the information map comprises receiving one or more of a vegetative index map that maps, as the values of the characteristic, vegetative index values to different geographic locations in the worksite and a seeding map that maps, as the values of the characteristic, seeding characteristic values to different geographic locations in the worksite, and wherein generating the predictive model comprises one or more of:

identifying a relationship between vegetative index values and values of crop height based on the value of crop height detected by the in-situ crop height sensor corresponding to the geographic location and the vegetative index value in the vegetative index map at the geographic location; and identifying a relationship between seeding characteristic values and values of crop height based on the value of crop height detected by the in-situ crop height sensor corresponding to the geographic location and the seeding characteristic value in the seeding map at the geographic location.

14. The computer implemented method of claim 11, wherein detecting, with an in-situ sensor, the value of the crop characteristic corresponding to the geographic location comprises detecting, with an in-situ crop density sensor, a value of crop density corresponding to the geographic location.

15. The computer implemented method of claim 14, wherein receiving the information map comprises receiving one or more of a vegetative index map that maps, as the values of the characteristic, vegetative index values to different geographic locations in the worksite and a seeding map that maps, as the values of the characteristic, seeding characteristic values to different geographic locations in the worksite, and wherein generating the predictive model comprises one or more of:

identifying a relationship between vegetative index values and values of crop density based on the value of crop density detected by the in-situ crop density sensor corresponding to the geographic location and the vegetative index value in the vegetative index map at the geographic location; and identifying a relationship between seeding characteristic values and values of crop density based on the value of crop density detected by the in-situ crop density sensor corresponding to the geographic location and the seeding characteristic value in the seeding map at the geographic location.

16. The computer implemented method of claim 11 and further comprising:

controlling a nozzle operation subsystem to deactivate a first nozzle of the mobile agricultural sprayer and activate a second nozzle of the mobile agricultural sprayer based on the functional predictive map.

17. A mobile agricultural sprayer comprising:

a communication system that receives an information map that maps values of a characteristic to different geographic locations in a worksite;

an in-situ crop characteristic sensor that detects a value of a crop characteristic corresponding to a geographic location;

one or more processors; and a data store configured to store computer executable instructions that, when executed by the one or more processors, are configured to configure the one or more processors to:

generate a predictive crop characteristic model indicative of a relationship between values of the characteristic and values of the crop characteristic based on the value of the characteristic in the information map at the geographic location and the value of the crop characteristic, detected by the in-situ crop characteristic sensor corresponding to the geographic location;

generate a functional predictive crop characteristic map of the worksite that maps predictive values of the crop characteristic to the different geographic locations in the worksite, based on the values of the characteristic in the information map at those different geographic locations and based on the predictive crop characteristic model; and generate, based on the functional predictive crop characteristic map, control signals to control one or more of:

a propulsion subsystem of the mobile agricultural sprayer;

a machine height subsystem of the mobile agricultural sprayer; and a boom height subsystem of the mobile agricultural sprayer.

18. The mobile agricultural sprayer of claim 17, wherein the computer executable instructions, when executed by the one or more processors, are further configured to configure the one or more processors to generate, based on the functional predictive map, control signals to control:

a nozzle operation subsystem, of the mobile agricultural sprayer, to deactivate a first nozzle and activate a second nozzle.

* * * * *